US011604735B1

(12) United States Patent
Segev et al.

(10) Patent No.: US 11,604,735 B1
(45) Date of Patent: Mar. 14, 2023

(54) HOST MEMORY BUFFER (HMB) RANDOM CACHE ACCESS

(71) Applicant: Western Digital Technologies, Inc., San Jose, CA (US)

(72) Inventors: Amir Segev, Meitar (IL); Dinesh Kumar Agarwal, Bangalore Karnataka (IN); Vijay Sivasankaran, Dublin, CA (US); Nava Eisenstein, Petah Tikwa (IL); Jonathan Journo, Shaarei Tikwa (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/541,028

(22) Filed: Dec. 2, 2021

(51) Int. Cl.
*G06F 12/0888* (2016.01)
*G06F 12/0891* (2016.01)

(52) U.S. Cl.
CPC ...... *G06F 12/0888* (2013.01); *G06F 12/0891* (2013.01)

(58) Field of Classification Search
CPC .......... G06F 12/0888; G06F 12/0891
See application file for complete search history.

(56) References Cited

U.S. PATENT DOCUMENTS

| 5,235,552 A * | 8/1993 | Nakajima | G11C 8/16 365/233.17 |
| 6,209,061 B1 * | 3/2001 | Nelson | G06F 12/0888 711/132 |

* cited by examiner

*Primary Examiner* — Aracelis Ruiz
(74) *Attorney, Agent, or Firm* — ArentFox Schiff LLP

(57) ABSTRACT

Aspects of a storage device are provided that allow a controller to leverage cache to minimize occurrence of HMB address overlaps between different HMB requests. The storage device may include a cache and a controller coupled to the cache. The controller may store in the cache, in response to a HMB read request, first data from a HMB at a first HMB address. The controller may also store in the cache, in response to an HMB write request, second data from the HMB at a second HMB address. The controller may refrain from processing subsequent HMB requests in response to an overlap of the first HMB address with an address range including the second HMB address, and the controller may resume processing the subsequent HMB requests after the first data is stored. As a result, turnaround time delays for HMB requests may be reduced and performance may be improved.

20 Claims, 14 Drawing Sheets

1100

Store in the Cache First Data from a HMB at the First HMB Address In Response to the HMB Read Request and Second Data from the HMB at the Second HMB Address In Response to the HMB Write Request 1122

Determine that the First Data is Not Previously Stored in the Cache and that the Second Data is Not Previously Stored in the Cache

1124

Store the First Data in the Cache and the Second Data in the Cache In Response to the Determination

1126

Determine Whether a First Buffer Associated with the HMB Read Request is Free and a Second Buffer Associated with the HMB Write Request is Free

1128

Store the First Data in the Cache In Response to the Determination that the First Buffer is Free and the Second Data in the Cache In Response to the Determination that the Second Buffer is Free

1130

Store the First Data at a First Cache Line Address and the Second Data at a Second Cache Line Address

1132

Free a LRU Cache Line Address, Where the Second Data is Stored At the LRU Cache Line Address

HOST MEMORY BUFFER (HMB) RANDOM CACHE ACCESS

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

A host device may include a host memory buffer (HMB). The HMB allows a storage device to utilize host volatile memory (e.g., dynamic random access memory (DRAM)) for the storage device's own purposes. For instance, although accessing data in a HMB (e.g., in a host DRAM) is slower than accessing data in a controller volatile memory (e.g., in a controller DRAM), such data access is still faster than accessing data from NAND memory, and therefore the controller may utilize the HMB to store various control information (e.g., logical addresses in an logical-to-physical (L2P) mapping table, file system data, etc.) and user data for host commands.

SUMMARY

One aspect of a storage device is disclosed herein. The storage device includes a cache and a controller coupled to the cache. The controller is configured to store in the cache, in response to a HMB read request, first data from a HMB at a first HMB address, and to store in the cache, in response to an HMB write request, second data from the HMB at a second HMB address. The controller is further configured to refrain from processing subsequent HMB write requests in response to an overlap of the first HMB address with an address range including the second HMB address.

Another aspect of a storage device is disclosed herein. The storage device includes a cache including a first cache line address and a second cache line address, and a controller coupled to the cache. The controller is configured to store at the first cache line address, in response to a HMB read request, first data from a HMB at a first HMB address, and to store at the second cache line address, in response to an HMB write request, second data from the HMB at a second HMB address. The controller is further configured to write data to the second HMB address in response to the first HMB address not overlapping with an address range including the second HMB address.

A further aspect of a storage device is disclosed herein. The storage device includes a cache including a first cache line address and a second cache line address, and a controller coupled to the cache. The controller is configured to store at the first cache line address, in response to a HMB read request, first data from a HMB at a first HMB address, and to store at the second cache line address, in response to an HMB write request, second data from the HMB at a second HMB address. The controller is further configured to refrain from processing subsequent HMB requests before the first data is stored in response to an overlap of the first HMB address with an address range including the second HMB address, and to resume processing the subsequent HMB requests after the first data is stored.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein:

FIGS. 11A-11C are a flow chart illustrating an example of a method for processing HMB requests according to various aspects of the present disclosure, as performed by the storage device of FIG. 1.

DETAILED DESCRIPTION

Figure 1:
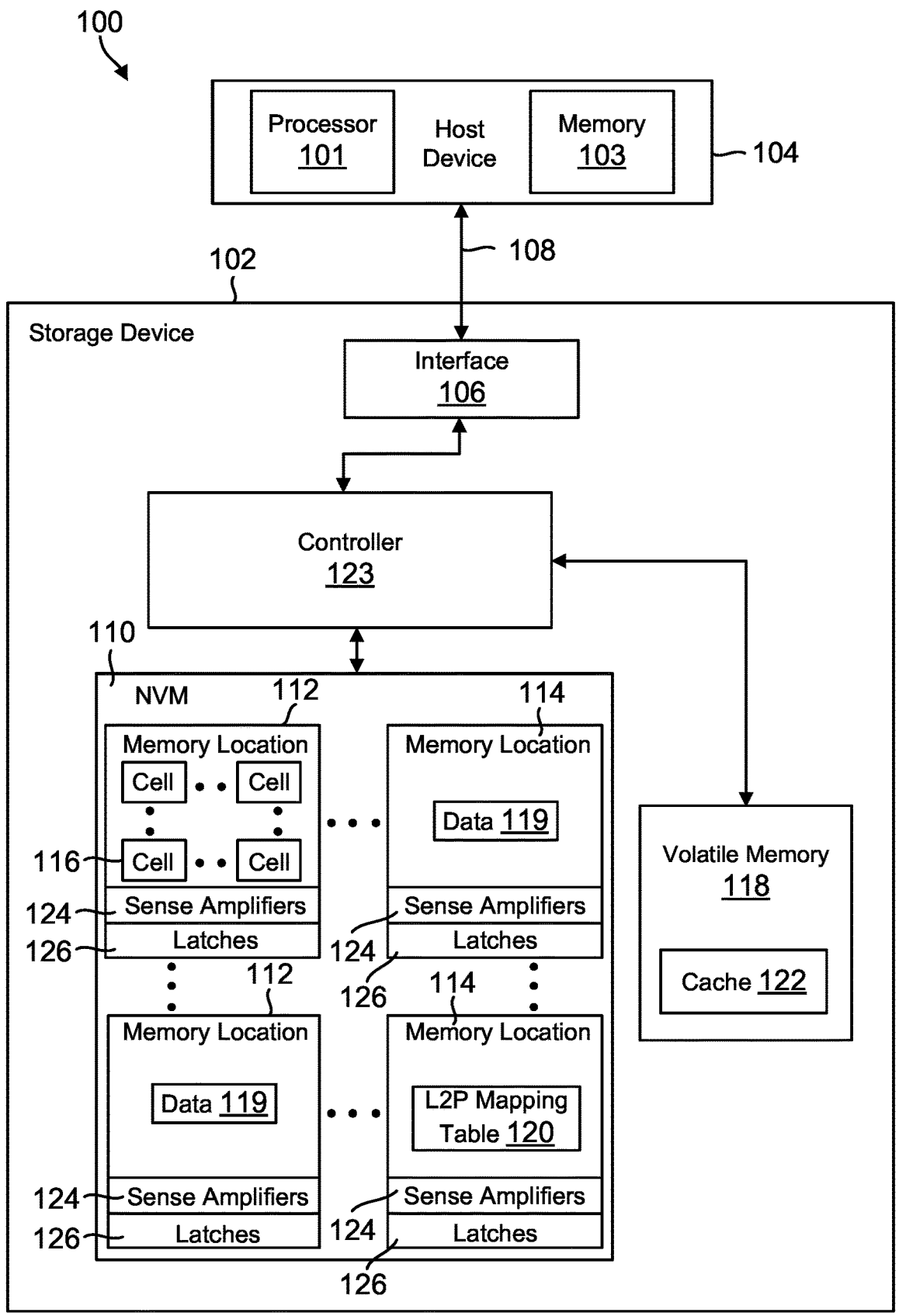
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Typically, a host device may include a HMB. The HMB allows a controller of a storage device to utilize host volatile memory (e.g., DRAM) for the storage device's own purposes. For instance, although accessing data in a HMB (e.g., in a host DRAM) is slower than accessing data in a controller volatile memory (e.g., in a controller DRAM), such data access is still faster than accessing data from NAND memory, and therefore the controller may utilize the HMB to store various control information (e.g., logical addresses in an L2P mapping table, file system data, etc.) and user data for host commands. Later on, when processing a command (e.g., a host command or an internal command), the controller may issue a HMB read request to obtain (fetch) control information from the HMB (e.g., HMB data), and apply this control information when executing the command (e.g., reading or writing data in the NVM or performing some other action in the storage device). If the controller determines to update control information in the HMB (e.g., an L2P update or file system data update in response to a power failure, during processing of a command, or some other event), the controller may similarly issue a HMB write request to write such control information to the HMB. The controller may execute different commands encompassing different processes (including HMB read requests) in parallel in a pipelined manner, such as illustrated and described below with respect to FIG. 6.

In a command process pipeline, a controller may perform a HMB read request for one command and a HMB write request for the same command or another command. In such case, it is important to maintain the order of the commands to ensure correct control information (e.g., HMB data) is being read or written in the HMB. For example, if the controller writes a page of control information to a range of HMB addresses in one command, and then reads a page of control information in the same range of HMB addresses in another command, the controller should end up reading the correct updated HMB data rather than the incorrect prior HMB data. Similarly, if the controller reads a page of HMB data from a range of HMB addresses in one command, and then writes a page of HMB data to the same HMB address range in another command, the controller should end up reading the correct prior HMB data rather than incorrect updated HMB data. However, in the former case, reads may bypass writes (e.g., the HMB read request may be completed first even though the HMB write request arrived first), and thus, the controller may end up reading the incorrect prior HMB data rather than the correct updated HMB data. Similarly, in the latter case, writes may bypass reads (e.g., the HMB write request may be completed first even though the HMB read request arrived first), and thus, the controller may end up reading the incorrect updated HMB data rather than the correct prior HMB data. Therefore, it would be helpful for the controller to address such bypass situations that may occur in the event a HMB read request and a HMB write request refer to the same HMB address range (e.g., an overlap of HMB addresses occurs).

One possible solution to the overlap problem is to delay the potentially bypassing HMB request. For instance, in the illustrated example of FIG. 6 described below, a command pipeline process may be designed so that the controller processes each command at each process stage of the pipeline within 1 μs, in order to manage a 4 μs turnaround time of HMB read requests for each command. In such case, for example, if prior CMD 1 involved an HMB read request and subsequent CMD 2 involved an HMB write request to overlapping HMB addresses, but the HMB write request of CMD 2 happened to bypass the HMB read request of CMD 1 and thus completes first, incorrect updated HMB data may be read. To prevent this result, the controller may delay execution of the HMB write request until after the HMB read request has completed first. However, such approach may end up increasing the turnaround time of HMB read requests for subsequent commands (e.g., to more than 4 us), thereby delaying further commands in the pipeline.

To minimize the occurrence of this delay as a result of HMB address overlap, the storage device of the present disclosure may incorporate a controller cache which stores the read (fetched) HMB data and buffers which link to the stored HMB data. More details related to the structure of the cache and buffers, and to a process for respectively storing and linking HMB data in the cache and buffers, are described below with respect to FIGS. 8 and 9A-9B. As a result, when the controller attempts to detect an overlap in requested HMB addresses, such as described below with respect to FIG. 10, the controller may rarely determine an overlap situation in which the aforementioned delay may result, thus effectively improving storage device performance.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/ laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
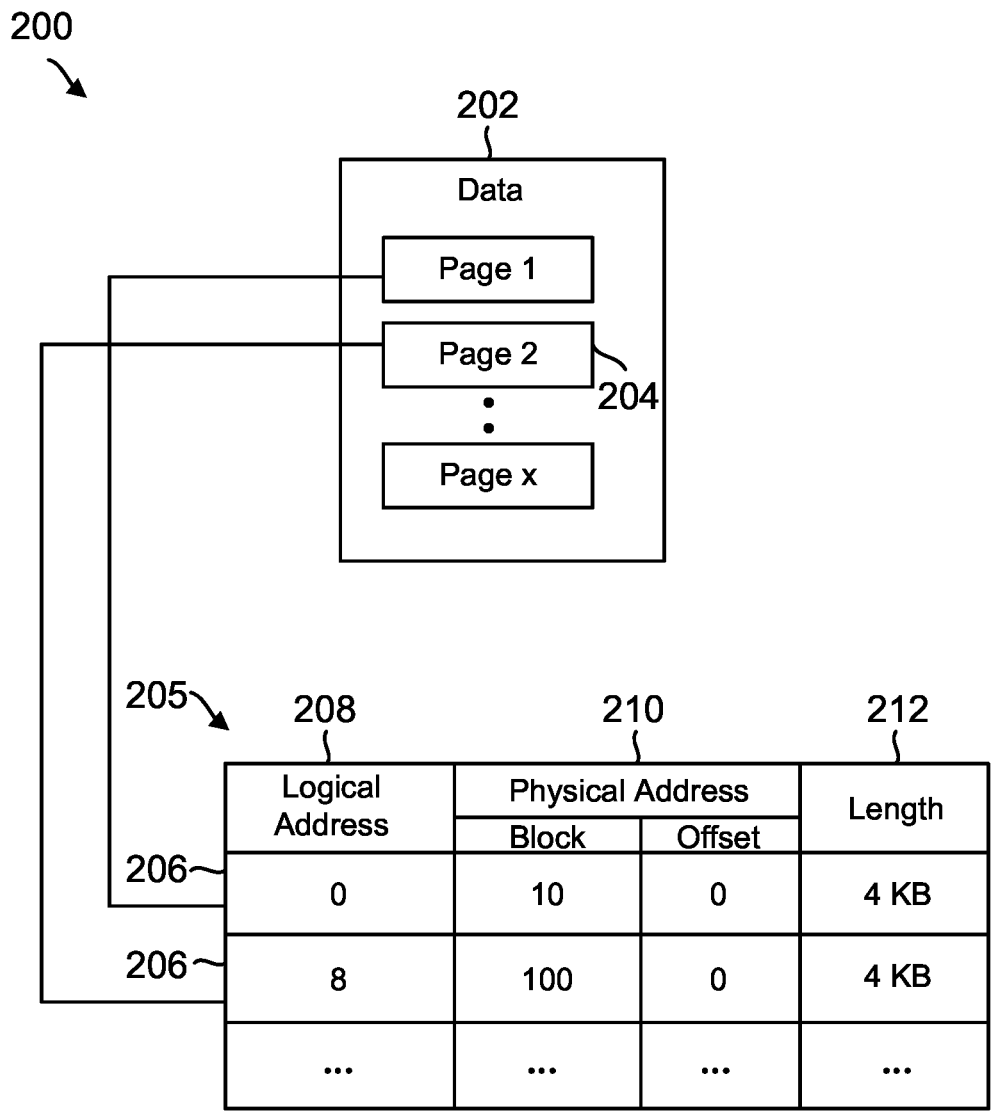
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller may access the host memory 103 for the mapping (or the L2P mapping table 120 if the host memory 103 does not store mappings) and the controller may store the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
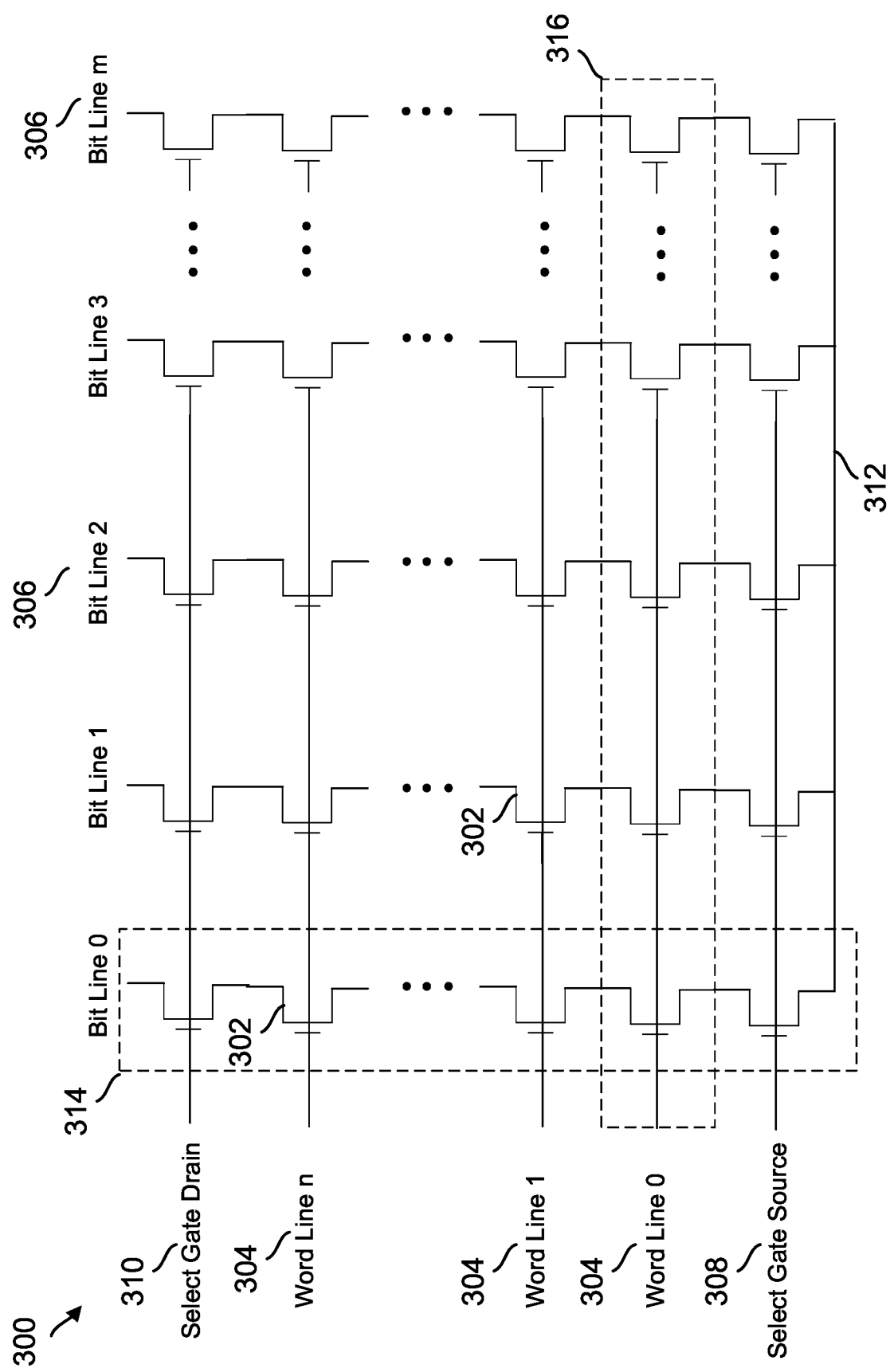
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
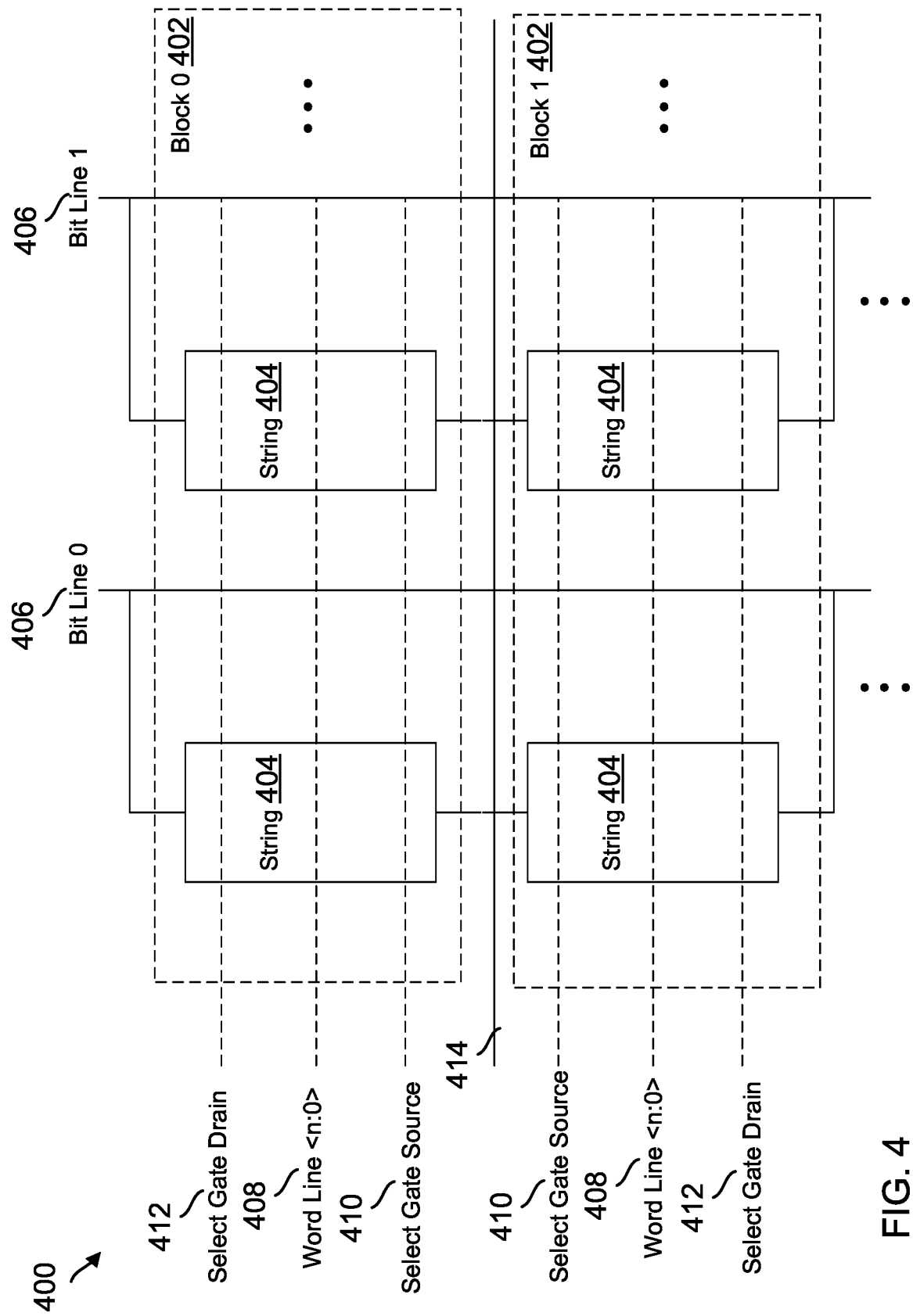
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 408 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 5:
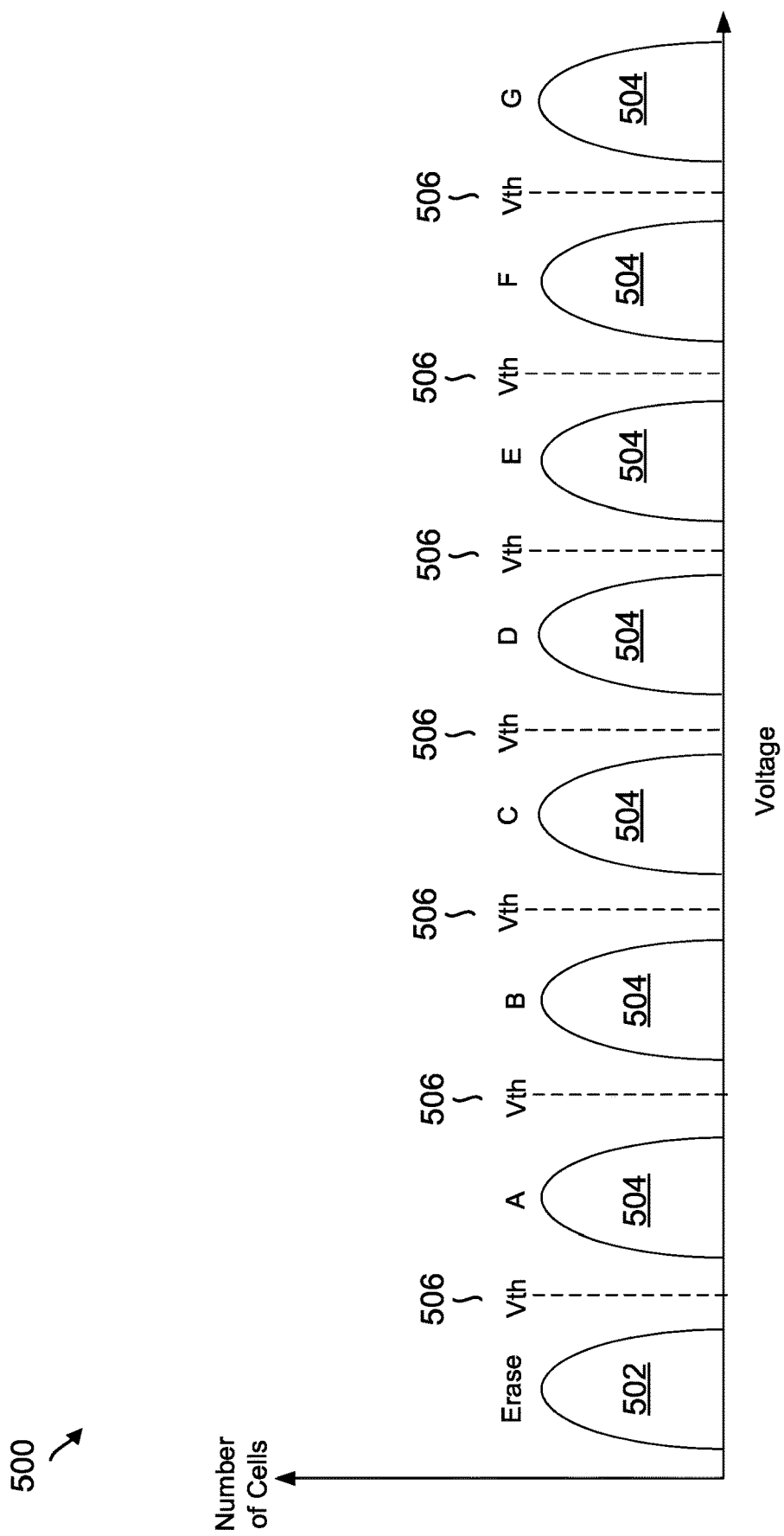
FIG. 5 is a graphical diagram illustrating an example of a voltage distribution chart for triple-level cells in the storage device of FIG. 1.

FIG. 5 illustrates an example of a voltage distribution chart 500 illustrating different NAND states for TLCs (e.g. cells 116, 302) storing three bits of data (e.g. logic 000, 001, etc. up to logic 111). The TLCs may include an erase state 502 corresponding to logic '111' and multiple program states 504 (e.g. A-G) corresponding to other logic values '000-110'. The program states 504 may be separated by different threshold voltages 506. Initially, the cells 116, 302 may be in the erase state 502, e.g. after the controller 123 erases a block 402 including the cells. When the controller 123 program LPs, MPs, and UPs as described above, the voltages of the cells 116, 302 may be increased until the threshold voltages 506 corresponding to the logic values to be stored are met, at which point the cells transition to their respective program states 504. While FIG. 5 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

Typically, host device 104 may include a HMB. The HMB allows the controller 123 of storage device 102 to utilize host volatile memory (e.g., DRAM) for the storage device's own purposes. For instance, although accessing data in a HMB (e.g., in a host DRAM) is slower than accessing data in a controller volatile memory (e.g., in a controller DRAM), such data access is still faster than accessing data from NAND memory (e.g., in NVM 110), and therefore the controller may utilize the HMB to store various control information (e.g., logical addresses 208 in L2P mapping table 120, 205, file system data, etc.) and user data (e.g., data 119) for host commands. Later on, when processing a command, the controller may issue a HMB read request to fetch control information from the HMB (e.g., HMB data), and apply this control information when reading or writing data to the NVM or performing some other action. For example, after the controller reads a logical address (e.g., logical address 208) or other control information from the HMB, the controller may sense or program data 119 in cells 116, 302 of blocks 402 at different program states 504 as previously described. If the controller determines to update control information in the HMB (e.g., an L2P update or file system data update in response to a power failure, during processing of a command, or some other event), the controller may similarly issue a HMB write request to write such control information to the HMB. The controller may execute different commands encompassing different processes (including HMB read requests and HMB write requests) in parallel in a pipelined manner, such as illustrated and described with respect to FIG. 6.

Figure 6:
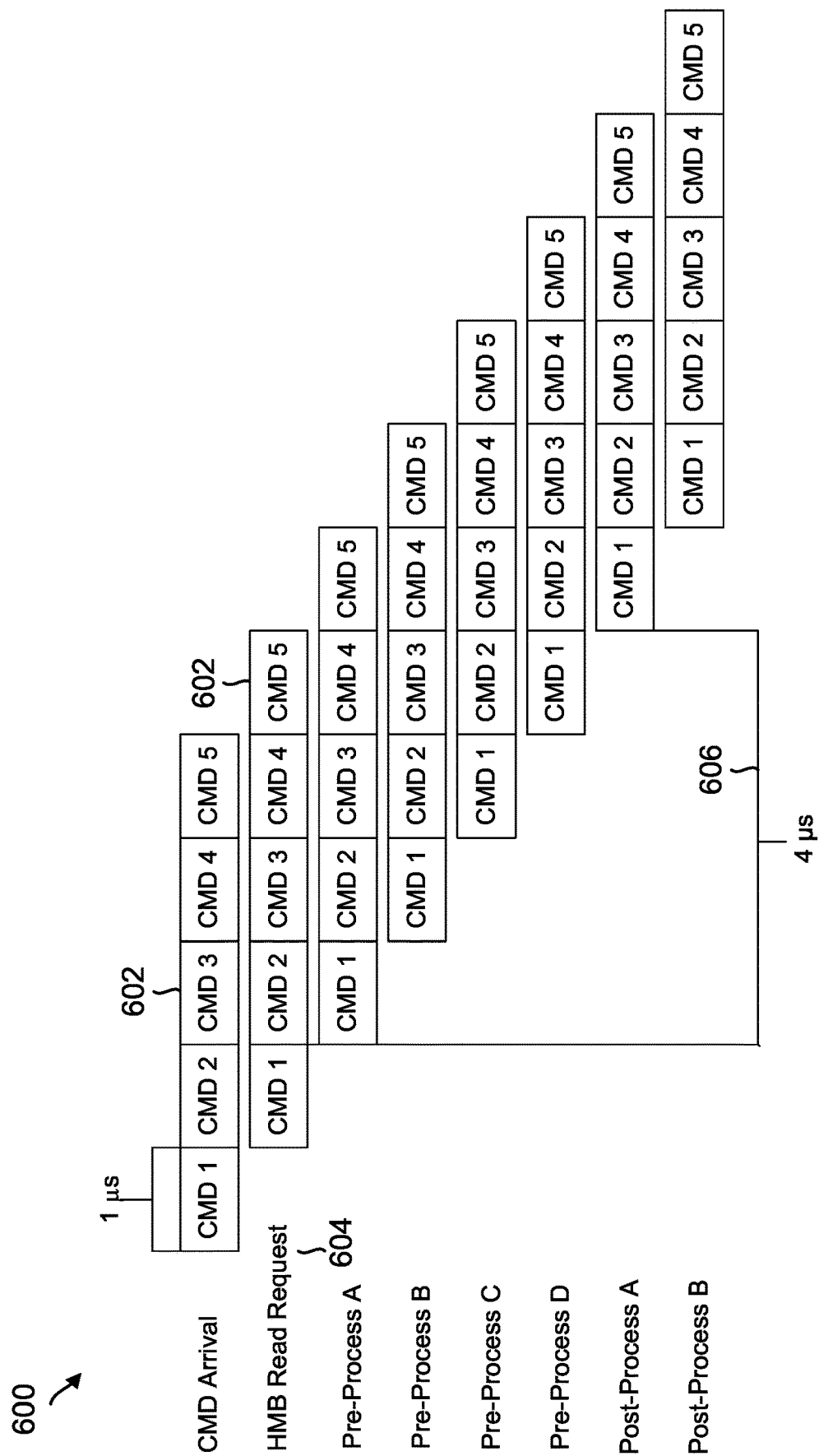
FIG. 6 is a conceptual diagram illustrating an example of a command process pipeline in the storage device of FIG. 1.

FIG. 6 illustrates an example 600 of a command process pipeline. When the controller determines to perform a command 602 (e.g., a host command to read or write data in the NVM or an internal command to perform some other action), the command 602 may be placed in a pipeline of processes with other commands. Each command may involve numerous processes. For instance, for each command, the controller may issue a HMB read request 604 to fetch control information associated with that command, the controller may perform one or more processes which precede completion of the fetch from the HMB (e.g., Pre-Processes A, B, C, and D, including in some cases an HMB write request), and after a turnaround time 606 for completing the HMB read request, the controller may perform one or more other processes following completion of the fetch from the HMB (e.g., Post-Process A, B). In the illustrated example, each command illustrates reading data from an HMB in a HMB read request, although in other examples, each command may also or alternatively involve reading and writing to an HMB (e.g., in a HMB write request involving read-modify-write). During the processing of the HMB read request for one command, the controller may perform pre-processes for that command and other commands in parallel, such as illustrated in FIG. 6. The pipeline may also be designed to account for the turnaround time 606 of HMB read request 604. For example, in the illustrated example of FIG. 1, each pre-process in FIG. 1 for a command may span 1 μs to allow for the HMB read request 604 to be processed in a turnaround time of 4 us. Alternatively, the time amounts may be different in other examples.

In the command process pipeline, the controller 123 may in some cases perform in one of the commands 602, the HMB read request 604 for HMB data in one address range, and the controller may perform in another one of the commands 602, a HMB write request (e.g., in one of the pre-processes) for HMB data in the same address range. In such case, it is important to maintain the order of the commands 602 to ensure correct control information (e.g., HMB data) is being read or written in the HMB. For instance, if the controller 123 writes a page of control information to a range of HMB addresses (e.g., including data at address 0xBABA . . . for example) in one of the commands 602, and then reads a page of control information in the same range of HMB addresses (e.g., including data at address (0xBABA . . . +8 bytes) for example) in another one of the commands 602, it is important that the controller 123 reads the correct updated HMB data rather than the incorrect prior HMB data. Similarly, if the controller 123 reads a page of HMB data from a range of HMB addresses in one of the commands 602, and then writes a page of HMB data to the same HMB address range in another one of the commands 602, it is important that the controller 123 reads the correct prior HMB data rather than incorrect updated HMB data. However, in the former case, reads may bypass writes (e.g., the HMB read request may be completed first even though the HMB write request arrived first), and thus, the controller 123 may end up reading the incorrect prior HMB data rather than the correct updated HMB data. Similarly, in the latter case, writes may bypass reads (e.g., the HMB write request may be completed first even though the HMB read request arrived first), and thus, the controller 123 may end up reading the incorrect updated HMB data rather than the correct prior HMB data. Therefore, it would be helpful for the controller 123 to address such bypass situations that may occur in the event a HMB read request and a HMB write request refer to the same HMB address range (e.g., an overlap of HMB addresses occurs).

One possible solution to the overlap problem is to delay the potentially bypassing HMB request. For instance, assume that, as in the illustrated example of FIG. 6, the command pipeline process is designed so that the controller 123 processes each command 602 at each process stage of the pipeline within 1 μs, in order to manage a 4 μs turnaround time of HMB read requests 604 for each command. In such case, for example, if prior CMD 1 involved an HMB read request and subsequent CMD 2 involved an HMB write request to overlapping HMB addresses, but the HMB write request of CMD 2 happened to bypass the HMB read request of CMD 1 and thus completes first, incorrect updated HMB data may be read. To prevent this result, the controller 123 may delay execution of the HMB write request until after the HMB read request has completed first. However, such approach may end up increasing the turnaround time 606 of HMB read requests for subsequent commands (e.g., to more than 4 us), thereby delaying further commands in the pipeline. Additional details with respect to this problem are described below with respect to FIG. 7 (as well as FIG. 6).

Figure 7:
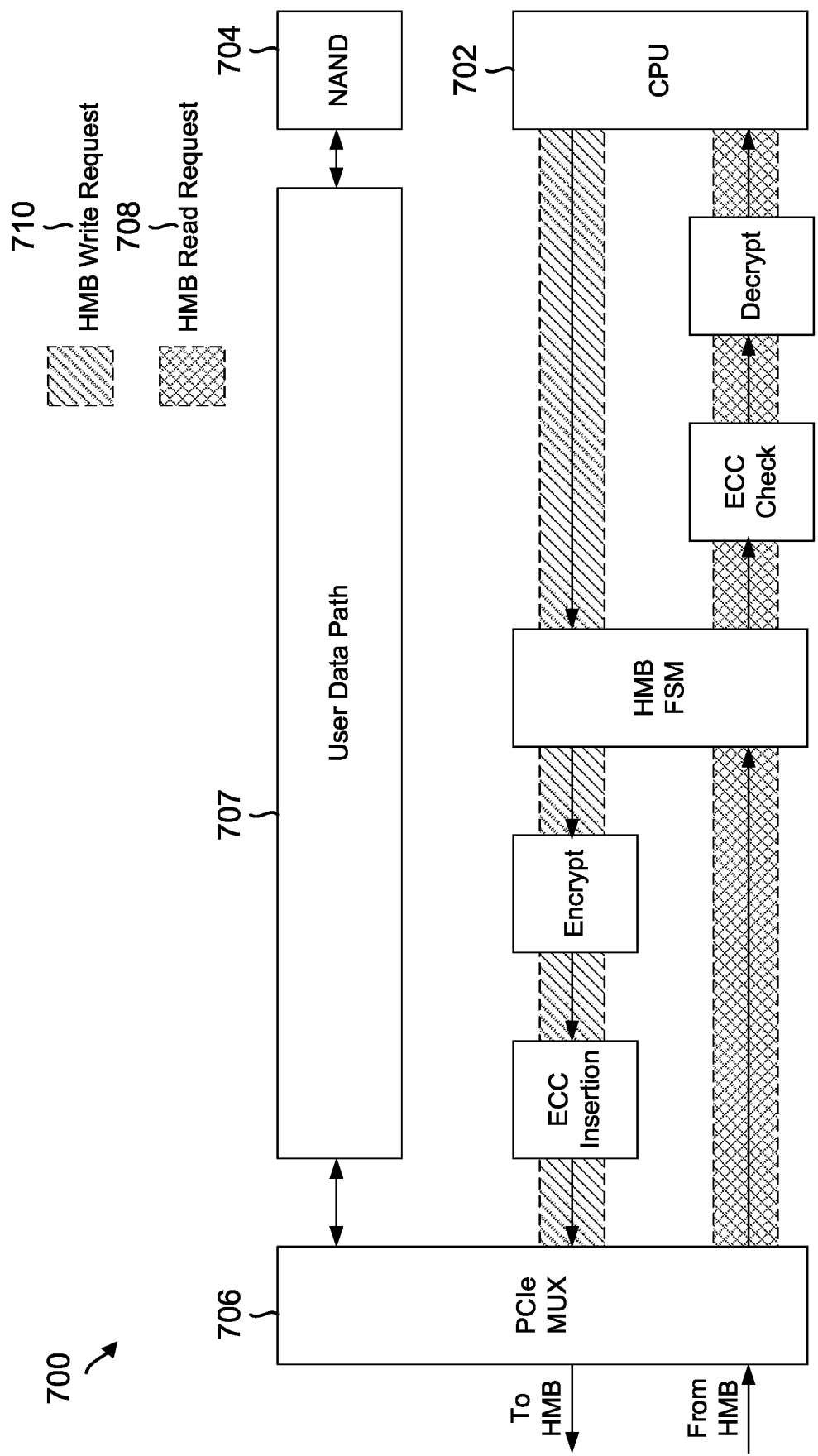
FIG. 7 is a conceptual diagram illustrating an example of a system architecture for HMB read and write requests in the storage device of FIG. 1.

FIG. 7 illustrates an example of a system architecture 700 in a storage device (e.g., storage device 102). Generally, to save costs, a controller (e.g., controller 123) including processor 702 may not have a DRAM coupled to the controller. Therefore, in order to store control data (e.g., L2P mapping tables, file system data, etc.), the controller may have to either rely on NAND memory 704 (e.g., NVM 110) or a HMB (e.g., a DRAM in, and allocated by, the host as an alternative to controller DRAM). The controller may access the HMB (not shown) over a bus (e.g., a PCIe bus), such as through a PCIe multiplexer 706. Since access over user data path 707 to the NAND memory 704 may be relatively slow compared to the HMB, the controller may generally choose to utilize the HMB for storing control data.

Typically, the controller 123 may utilize the HMB as a staging area for different operations (e.g., garbage collection, data recovery for RAID, XOR mechanisms, or for storing other control information or user data). The host may also store control information (e.g., HMB data) and user data (e.g., data 119) in the HMB (e.g., the host DRAM) for the controller 123 to utilize when reading or writing user data to the NAND memory 704. The controller 123 may read this control information or user data from the HMB to a HMB flash storage module (FSM) for subsequent processing by processor 702 (e.g., after an error correction code (ECC) check and data decryption) in response to a HMB read request 708 (e.g., HMB read request 604). Similarly, the controller may write or update control information or user data in the HMB from the HMB FSM (after data encryption and an ECC insertion) in response to a HMB write request 710.

In one example, each time the host issues a write command (e.g., an example of command 602 in FIG. 6) to the storage device, the controller 123 may issue requests to read data and control table information from the HMB in different HMB read requests in order to perform the NAND write. The processing of each HMB read request may have a large turnaround time (e.g., turnaround time 606). For example, if for one command, the controller requests to read user data (e.g., 16 KB of data) from the HMB in one HMB read request, and for another command, the controller requests to read control data (e.g., 4 KB of data) from the HMB in another HMB read request, the turnaround time for the second command may be large (e.g., 4 us between the time controller sends request to host and the time controller receives data from host), since the host is still processing the first command (e.g., 16 KB). For instance, the process may take 4 μs (or other turnaround time) for the host device to finish a previous read request and clear the bus between the controller and the HMB (e.g., a PCIe bus) before the next read is processed.

Such large turnaround time (e.g., 4 μs) for fetching the control information for a command may be acceptable for background operations performed in the staging area, since the controller may perform other operations in the interim (e.g., pre-processes such as illustrated in FIG. 6). However, this latency may significantly impact storage device performance if the controller intends to perform foreground operations in the firmware such as NAND writes requiring this control information. In such case, the controller may end up waiting for the control information to be completely read from HMB before the controller performs its pre-processes, thereby delaying the host command pipeline process. For example, in the pipeline illustrated in FIG. 6, pre-process A may be performed 4 μs after the HMB read request 604 (rather than 1 μs).

Generally, when the controller 123 services a host command (e.g., an example of command 602), the controller performs multiple pre-processes in order to check whether the command is valid while a HMB read request is pending. For example, for each command, the controller 123 may check if the command does not include any errors, the controller may check if data to be read from NAND is in a protected area, the controller may check if a read-modify-write is to be performed, the controller may prepare descriptors for different hardware engines to sense and program data in NAND, and the like. For instance, referring to FIG. 6, if CMD 1 is a host read command, the controller may send a HMB read request for LBA information for the data to be read. While waiting for this LBA information, the controller may prepare a descriptor for one engine in one pre-process A, prepare a descriptor for error correction for another engine in another pre-process B, prepare encryption keys for security in another engine in another pre-process C, and trigger another engine to perform a direct memory access (DMA) transfer of decrypted and error corrected data to the host in another pre-process D. The controller may perform these or other processes until the controller obtains the LBA from the HMB. Afterwards (e.g., a turnaround time of 4 μs or other time later), the controller may instruct another engine to read the data from the NAND in one post-process A, and transfer via DMA the read data back to the host in another post-process B.

Moreover, as illustrated in the example of FIG. 6, if each of the aforementioned processes spans a maximum time of 1 μs for each command in the command process pipeline, the kilo-input-output-operations per second (KiOPs) of the system would be large. However, the KiOPs may significantly reduce in the event of a read bypassing a write or a write bypassing a read. For example, if the controller 123 issues HMB write request 710 for one command and a HMB read request 708 for a different command following or preceding the HMB write request (e.g., due to mixed load of read/write commands or random writes), a situation of writes bypassing reads or reads bypassing writes may result. For example, in FIG. 6, if CMD 1's HMB read request involves a read to an HMB address range including 0xBABA . . . (e.g., to obtain control info for a read command), and CMD 2's pre-process A involves a HMB write request to the same HMB address range including 0xBABA . . . (e.g., to store data for a write command), a bypass situation where CMD 2's process is performed before CMD 1's process may result in the wrong data being read from the HMB for CMD 1.

To prevent this bypass result from overlapping HMB addresses, the controller may delay execution of CMD 2's HMB write request until after CMD 1's HMB read request is fully processed. For example, referring to FIG. 6, the delay may cause CMD 2's process to execute 4 μs after CMD 1's process, instead of 1 μs as before, and this latency may in turn delay each process in the command process pipeline. As a result, in this example, the KiOPs of the system may reduce by four times its original value (e.g., due to the longest process length for CMD 2 having increased by four times its original value as a result of the delay). Similarly, subsequent commands (e.g., CMD 3 and so forth) may be delayed by 4 μs afterwards as well for each process, continuing down the pipeline and reducing KiOPs.

Accordingly, aspects of the present disclosure are hereafter described which may reduce the likelihood of overlap situations arising which may affect KiOPs, but which nevertheless detect such situations in the event an HMB address overlap does arise. Referring to example 800 of FIG. 8, a cache 802 (e.g., cache 122, such as SRAM) may be coupled to (e.g., included in) the controller 123 for storing read HMB data from a HMB 804 (e.g., in host DRAM). Generally, when the controller reads HMB data (e.g., control information) from the HMB, the controller does not simply read a desired amount of bytes (e.g., 4 bytes or other number of bytes for an address for example). Rather, due to ECC considerations, the controller generally reads a page 806 (or block) amount of data (e.g., 128 bytes or other number of bytes in a ECC page) from which the control information (e.g., the 4 bytes) may be obtained. The controller may store this page 806 or block of data in the cache 802, so that the controller may obtain this data again more quickly if desired for other commands or HMB requests.

Figure 8:
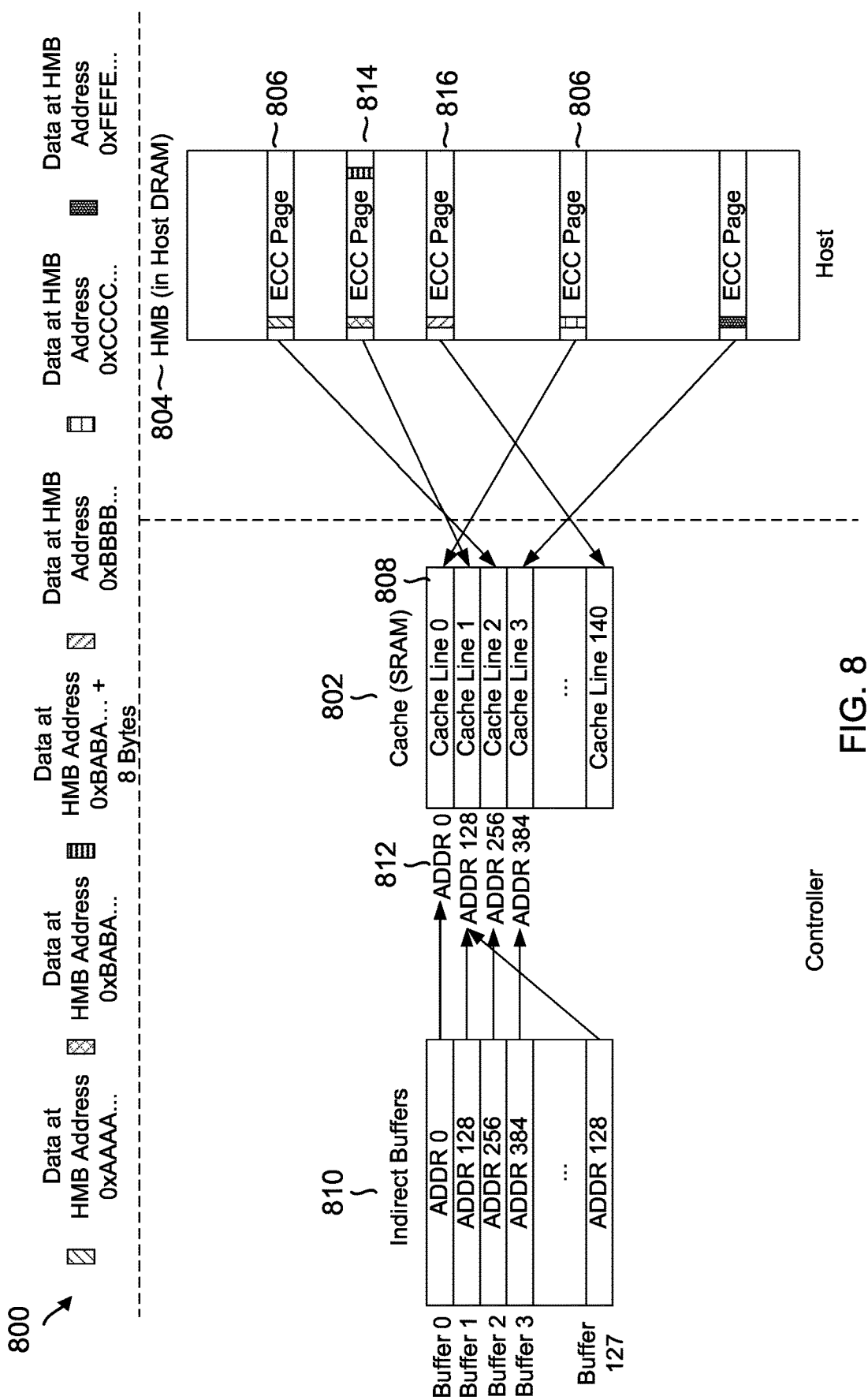
FIG. 8 is a conceptual diagram illustrating an example of a cache storing HMB data fetched from a host and buffers pointing to the stored HMB data in the cache in the storage device of FIG. 1.

Referring to FIGS. 6-8, in response to one of the commands 602 (e.g., CMD 2) the controller 123 may determine to perform HMB read request 604, 708 or HMB write request 710. For example, the controller may read from the HMB 804 (in response to a HMB read request) a logical address in which to write data, or the controller may determine to read, modify, and write back an update to the logical address in the HMB 804 (in response to an HMB write request). In one example, assume that the HMB data being read in response to the HMB request is a logical, 4-byte address stored in the HMB at address 0xBABA . . . . In order to read this HMB data in response to the HMB request, the controller may read the page 806 containing the HMB data (e.g., 128 bytes) from the HMB at the HMB address range including 0xBABA . . . , and the controller may store this page 806 of data in a cache line 808 that is next available in cache 802 (e.g., cache line 1 corresponding to SRAM address "128" in the illustrated example of FIG. 8). Moreover, the controller may include a plurality of buffers 810 (e.g., hardware registers) which may each individually correspond to one of the HMB requests in the command process pipeline of FIG. 6 (e.g., buffer 0 for HMB read request 604, 708 or HMB write request 710 in CMD 1, buffer 1 for HMB read request 604, 708 or HMB write request 710 in CMD 2, etc.), and the controller may store in each buffer a pointer to the cache line containing the HMB data fetched in response to the associated HMB request (e.g., a cache line address 812). For example, as illustrated in FIG. 8, if the HMB data for CMD 2 is stored in cache 802 starting at SRAM address "128" (corresponding to cache line 1), where SRAM address "128" includes the same data stored in the HMB at host DRAM address 0xBABA . . . , the controller may store that SRAM address in buffer 1 in order to link that buffer to the requested HMB data. Thus, each buffer may indirectly store HMB data for a corresponding HMB request, and the controller may link different buffers associated with different HMB requests to cache lines containing the requested HMB data. For example, in the illustrated example of FIG. 8, buffer 0 may point to a cache line read from a 128 byte HMB address range including 0xAAAA . . . during the HMB read request for CMD 1, buffer 1 may point to a cache line read from a 128 byte HMB address range including 0xBABA . . . during the HMB read request for CMD 2, and so forth. The buffers may also be accessed circularly when the number of HMB requests (or commands) is larger than the number of buffers available. For example, if the controller is executing CMDs 129, 130, etc. after storing a pointer in buffer 127 for CMD 128, the controller may store a pointer in buffer 0 for CMD 129, a pointer in buffer 1 for CMD 130, and so forth. Thus, a low-cost controller (e.g., a controller without DRAM) that relies on the HMB 804 to store control information or other HMB data for different commands, may more quickly access ECC pages including this HMB data in different cache lines of controller cache (e.g., SRAM).

In addition to saving access time compared to the HMB 804, local caching here may result in other benefits. Typically, host DRAM may store a significantly large amount of data (e.g., 4 TB of data), the HMB 804 in the DRAM may be allocated to store a portion of this data (e.g., 1 GB of data), and the controller SRAM (cache 802) may store an even smaller portion of this data (e.g., 1 MB). As a result of the HMB and host DRAM being significantly larger than cache 802, if the controller did not include this cache 802 but instead read directly from the HMB (using the PCIe bus in FIG. 7) each time the controller requests HMB data, the numerous HMB reads would waste system bandwidth with inefficient PCIe transfers. This inefficiency is especially apparent if the HMB data for different commands is stored in sequential HMB addresses. Also, if the controller lacked or did not apply cache 802, then each time the controller requests to write data directly to the HMB 804 at an HMB address (e.g., 0xBABA . . . ), the controller may end up inefficiently performing read-modify-write as a result of ECC considerations for each HMB write. For example, in response to every HMB write request, the controller may read an ECC page of HMB data (e.g., 128 bytes or so) from an address range including a requested HMB address, modify the desired 4 or so bytes at the requested HMB address to update the data, and write the modified HMB data back to the HMB. In contrast, when the cache 802 in the controller is applied, once an ECC page of HMB data is fetched from the HMB 804 into cache 802, the controller may simply update HMB data at the requested HMB address in the cache line without having to perform a read-modify-write, since the ECC considerations have already been accounted for in the cached data. Moreover, after the HMB data update(s) are performed in cache 802, the controller may flush the cache back to the HMB, so no data is lost.

Furthermore, the plurality of buffers 810 which indirectly store HMB data (by pointing to the cache which directly stores such data) may result in further benefits. For instance, if the controller did not include these indirect buffers, and instead applied cache or direct buffers to store HMB data for each respective request, the cache lines may be stored inefficiently. For instance, assume that in one example, the controller stores ECC page 814 including HMB data at address 0xBABA . . . in a cache line (e.g., cache line 1) or buffer used for CMD 2. Moreover, assume in this example that for CMD 128, the controller issues a HMB write request for HMB address 0xBABA+8 bytes (which is in a same ECC page 814 as 0xBABA, such as illustrated in the example of FIG. 8). In response to the HMB write request and in order to update HMB data at the latter address, the controller may inefficiently read the ECC page 814 again and store a duplicate copy in a different cache line or buffer for CMD 128. However, if the indirect buffers are applied, this duplicate cache line storage may be avoided, since the controller may instead store different pointers (addresses) to the different HMB data in the same cache line stored in cache 802. For instance, as in the illustrated example of FIG. 8, in response to an HMB write request to update HMB data in 0xBABA . . . for CMD 2, the controller may store ECC page 814 in cache line 1 once and then a pointer to cache line 1 in buffer 1 (e.g., SRAM address 128 for 0xBABA . . . ), and in response to an HMB write request to update HMB data in 0xBABA . . . +8 bytes for CMD 128, the controller may refrain from storing ECC page 814 again in a cache line and instead store a different pointer to cache line 1 in buffer 127 (e.g., SRAM address 128+8 bytes=SRAM address 136 for 0xBABA . . . +8 bytes). Afterwards, the controller may write HMB data to the linked addresses in the buffers for CMDs 2 and 128 respectively in cache line 1 (without needing to perform read-modify-writes since the writes are directly to the cache as previously described), and the controller may flush the cache including cache line 1 back to the HMB later on in order to update the HMB data for 0xBABA and 0xBABA+8. Moreover, in the event the cache 802 runs out of empty cache lines for storing HMB data and a pointer in a buffer for a new request, the controller may flush a least recently used (LRU) cache line back to the HMB so that the LRU cache line may be freed for new HMB data for the new command.

Additionally, another benefit of these buffers 810 is that the controller may be able to more easily determine with the buffers, than without, which cache line address 812 in cache 802 includes the HMB data desired for a given command. For instance, without these buffers and for each command, the controller may end up checking each cache line stored in cache in order to locate the HMB data requested at 0xBABA, 0xBABA+8 bytes, or some other HMB address. As an example, if the illustrated example of FIG. 8 is slightly adjusted such that CMD 2 is for HMB data stored in cache line 127 and CMD 128 is for HMB data stored in the same cache line 127, the controller may end up checking all the cache lines in cache 802 to determine whether cache line 127 is already stored. If the cache line is not stored yet in cache, a LRU cache line would be evicted and a new cache line would be read from the HMB. However, by including buffers 810 associated with each command 602 pointing to different SRAM locations of cache 802, the controller may determine whether a cache line is already stored in cache 802 without checking all the SRAM addresses. For example, if CMD 2 requests HMB data from HMB address 0xBABA . . . and corresponding buffer 1 points to SRAM address "128" including cache line 1 for 0xBABA . . . , then for CMD 128, the controller may determine from buffer 1 that CMD 2 already points to the cache line including HMB address 0xBABA . . . +8 bytes already in cache 802. As a result, the controller may refrain from checking all the SRAM addresses in the cache to find HMB data requested at 0xBABA . . . or 0xBABA . . . +8 bytes, and instead simply point the buffer 127 for CMD 128 to the previously stored cache line 1 (e.g., SRAM address 128+8 bytes=SRAM address 136).

In one example, the buffers 810 may be hardware buffers which store cache line addresses 812 including requested HMB data at corresponding HMB addresses. In other words, the buffers indirectly store cached HMB data. Accordingly, to understand which hardware buffer is associated with which cache line at a given time, the controller may implement a mapping table in volatile memory which maps each buffer to the corresponding cache line. For example, the controller may include a register storing a mapping of hardware buffers to cache lines (or to the SRAM addresses storing these cache lines or to the HMB DRAM addresses). Thus, the controller may store an associated list of HMB data addresses including HMB data that has been stored in cache for the buffers. In other words, the controller may maintain a buffer mapping list or table mapping hardware buffers (or HMB requests) to cache lines (or controller SRAM addresses or host DRAM/HMB addresses), and the controller may check this list or table when checking whether a particular cache line is stored without having to check the entire cache 802.

Figure 9:
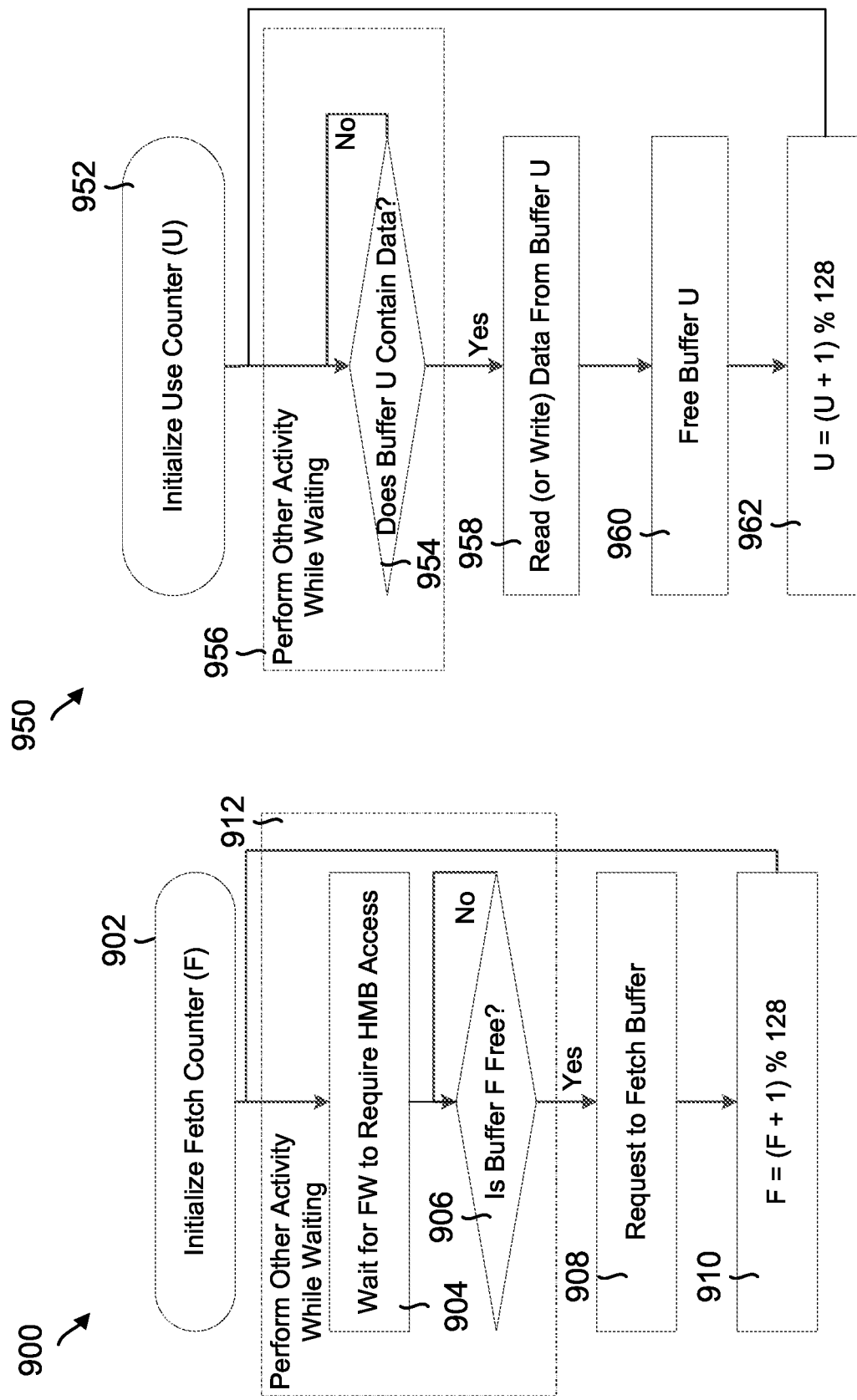
FIGS. 9A-9B are flow charts illustrating examples of processes for fetching HMB data and executing commands including fetched HMB data, respectively, as performed by the storage device of FIG. 1.

FIGS. 9A and 9B illustrate examples 900, 950 of processes for fetching HMB data and executing commands including fetched HMB data, respectively. The commands may correspond to the commands 602 in the command process pipeline of FIG. 6, and the processes of examples 900 and 950 may be performed by the controller in parallel. Initially, at blocks 902 and 952, the controller 123 may initialize a fetch counter (F) (e.g., F=0) and a use counter (e.g., U=0). The fetch counter F may represent a current buffer (e.g., buffer 810) for a HMB request in response to which HMB data is to be fetched from the HMB 804, while the use counter U may represent a current buffer for a HMB request in response to which HMB data has already been fetched to cache and linked in the current buffer.

Referring to FIG. 9A, when the controller intends to access the HMB at block 904 (e.g., in response to an HMB read request or HMB write request responsive to, for example, one of the commands 602), the controller may initially access the current buffer F=0. Throughout the process of FIG. 9A, the controller may access other buffers in response to other HMB requests for other commands as F increases (e.g., F=1, 2, etc.), although the controller may in some cases access buffers out of order of the value of F. For example, even if F has later on incremented to a value such as F=3, the controller may access a prior buffer again for an action related to a prior command (e.g., F=0, 1, or 2) before accessing current buffer F.

Going back to the example where initially F=0, the controller checks at block 906 whether the current buffer F is free. Buffer F may be free if it is empty, or if it is currently storing a pointer associated with a previously completed request for a command (e.g., buffer 0 will be free after CMD 0 is complete, buffer 1 will be free after CMD 1 is complete, etc.). In the beginning, all the buffers 810 may be free. Once the buffers are completely filled with pointers (e.g., after 128 commands are received and associated buffers allocated), F may return back to 0, at which point a following command may wait until the current buffer is again free. For example, in the illustrated example of FIG. 8, after CMDs 1-128 are received and buffers 0-127 are correspondingly allocated (resulting in F returning back to 0), if CMD 129 is then received, the controller may wait until buffer 0 is free (e.g., after CMD 0 is complete) before allocating buffer 0 to an HMB request for CMD 129, then similarly buffer 1 to an HMB request for CMD 130, and so forth.

When a current buffer F is free, the controller 123 at block 908 may issue a request (e.g., a HMB read request or HMB write request) to obtain HMB data from the HMB 804 at a requested HMB address (e.g., 0xBABA . . . ). In response to the request, the cache 802 may fetch the HMB data and store the HMB data in a next available cache line, and once the cache line is stored, the controller may link current buffer F to that cache line by storing a pointer to that cache line address, all such as described above with respect to FIG. 8. After storing the pointer in the buffer, the controller may increment F at block 910 (e.g., from F=0 to F=1), and repeat the aforementioned HMB request process for the next current buffer F (e.g., F=1, then again for F=2, and so forth until F returns to 0 and repeats as described above). While the controller is waiting for the cache to fetch the HMB data from the HMB 804 for a command, the controller may perform other activity for that command (e.g., at block 912), such as the pre-processes described above with respect to FIG. 6. The controller may similarly perform other activity for other commands in the command process pipeline during this time, such as repeating the aforementioned process for a different buffer F.

In parallel with the process of FIG. 9A, the controller may perform steps of the process of FIG. 9B. For instance, after turnaround time 606, data may eventually be fetched from the HMB 804 to the cache 802 and linked in current buffer U (starting with U=0). The current buffer U may be for a different HMB request than that associated with the current buffer F (e.g., U may not be equal to F). Accordingly, at block 954, the controller may check whether current buffer U includes data (e.g., a pointer linking to a cache line address). Until current buffer U is determined to store the data, the controller may perform other activity while waiting (e.g., at block 956), similar to that described above at block 912. Once the current buffer U stores the pointer, then at block 958, the controller may execute the command triggering the HMB request associated with current buffer U (e.g., by reading or writing data depending on the command using the data in the current buffer). For example, the controller 123 may access the cached HMB data (e.g., a logical address) linked by buffer U and then read or write data in that logical address in the NVM 110 in response to the read or write command, respectively. This reading or writing may correspond, for example, to one of the post-processes for a particular CMD described above with respect to FIG. 6.

After the controller completes executing the command triggering the HMB request associated with buffer U, at block 960, the controller frees the current buffer U (e.g., empties the buffer or disassociates the buffer from the completed command) in order to allow buffer U to be linked to a cache line for another HMB request later on. Additionally, the controller may maintain the cache line previously linked to that buffer in the cache 802 in the event a subsequent HMB request is to be linked to that same cache line (rather than a different cache line stored in cache 802). Then, at block 962, the controller may increment U and repeat the aforementioned process for the next current buffer U (e.g., U=1, and then similarly for U=2, and so forth). Thus, HMB data may be fetched into cache 802 and linked in buffers 810 for different commands at the same time that other commands are executed using this HMB data and unlinked in buffers 810 for these other commands.

Additionally, in the above-described fetch and link process for each buffer F described above in the process of FIG. 9A, the controller 123 may additionally check whether HMB data is already cached in cache 802 before requesting to fetch the HMB data at block 908 in an HMB read request or HMB write request. For instance, referring to the example of FIG. 8, the controller may determine for CMD 128 (associated with buffer 127) that HMB data at HMB address 0xBABA . . . +8 bytes is already cached in cache line 1 linked to buffer 1 for CMD 2 (in ECC page 814). In such case, the controller may conclude that the HMB data is already cached, and therefore when the controller performs block 908, the controller may refrain from requesting the cache to fetch the HMB data again and may instead simply link the current buffer F (e.g., F=127) to the previously cached line (e.g., cache line 1). However, even though the data is already cached (and thus the UE may determine at block 954 that buffer U contains the pointer already), the controller may still wait a period of time equal to turnaround time 606 before executing the command at block 958 and freeing the buffer U at block 960. In this way, the command process pipeline timing such as illustrated in FIG. 6 may still be maintained.

On the other hand, if the controller determines that the HMB data is not yet cached, then the controller may additionally check whether a cache line is free (e.g., a SRAM address is empty in cache 802). If a cache line is free, then the controller may proceed to perform block 908 and request to fetch the HMB data to be linked in buffer F. If, however, no cache lines are currently free, the controller may free one of the cache lines prior to requesting to fetch the HMB data at block 908. For instance, the controller may determine a LRU cache line (SRAM address), empty data in that cache line, and then request the cache 802 to fetch the HMB data and store the fetched data in the freed cache line at block 908 accordingly. Additionally, the controller may prevent freeing of a cache line currently linked to a buffer for a different command, including LRU cache lines, by including more cache lines (e.g., SRAM addresses capable of storing HMB data) than buffers 810. For instance, as illustrated in the example of FIG. 8, ECC page 816 may be stored in a spare cache line 140 that is not linked to any buffer currently. As a result, the controller may free cache line 140 if all other cache lines are occupied prior to performing block 908, allowing the buffers 810 to remain valid (by not pointing to freed/empty cache lines while commands are still pending).

Now, referring to FIGS. 6, 8 and FIG. 9A, as an example, assume in a variation of FIG. 8's illustrated example that, at block 908, the controller issues HMB read request 604, 708 for HMB data at 0xBABA . . . when F=0 (CMD 1). In response to the request, the cache 802 may attempt to read HMB data from an HMB address range including 0xBABA . . . for the associated CMD 1. During this time, a hardware engine of the controller may track this HMB read request 604, 708 for HMB data at the specified HMB address 0xBABA . . . . For instance, the controller may maintain a database which tracks different HMB read requests specifying different HMB data address ranges for different commands (e.g., including 0xBABA . . . for CMD 1). Afterwards, assume in this variation of FIG. 8's illustrated example that, in a different iteration of the process at block 908, the controller determines to issue HMB write request 710 for HMB data from the same address range at 0xBABA . . . +8 bytes . . . when F=1 (CMD 2), and then to write/update new data to 0xBABA in response to the request. In such case where there is an overlapping HMB address range, it is possible that the later write to the HMB address may occur before the earlier read from the HMB address, thus resulting in a write bypass read situation as described above. To prevent this situation, the hardware engine in the controller may stall the write from happening until the read is completed. This stalling may prevent wrong data from being read for CMD 1 due to the address overlap with CMD 2. The controller may thus block HMB write requests from happening when they involve HMB addresses overlapping with previously issued and pending HMB data reads in those addresses. Once the controller completes the HMB read request, the controller may stop blocking the HMB write request.

If the controller blocks an overlapping HMB write request for one command until a pending HMB read request is completed for a different command as described above, the turnaround time 606 to perform the HMB write request may increase from 1 μs to 4 μs. For instance, if the controller detects an overlap in requested HMB addresses between CMD 1 and CMD 2, the HMB write request for CMD 2 may be stalled during the turnaround time 606 for the HMB read request for CMD 1. Thus, the pipeline between CMD 1 and 2 may be delayed in response to the overlap detection.

While this delay may theoretically result in a reduction of KiOPs by a factor of the turnaround time 606, practically the KiOPs may not be reduced in most situations since the detection of an actual overlapping situation may be very rare due to the above-described implementation of cache 802. For example, when the case of a HMB write request following a HMB read request arises such as previously described, a write bypassing read situation may arise if the HMB data write to 0xBABA . . . occurs for CMD 2 before the HMB data read to 0xBABA occurs for CMD 1. However, if the HMB data was fetched and stored in cache 802 in response to the HMB read request for CMD 1, then even if the HMB write request for CMD 2 results in an update to an overlapping HMB address in the host DRAM, the controller may still apply the correct HMB data in cache (unaffected by the HMB write) when executing CMD 1. Thus, the HMB write request for CMD 2 need not be stalled in favor of the HMB read request for CMD 1 in such situation. Rather, continuing with this example, the controller may determine to block the HMB write request on the condition that the cache line storing the HMB data fetched from the HMB for CMD 1 is freed before CMD 2 is processed (for example, in cases where the cache line for CMD 1 became LRU and thus was freed before the HMB read request for CMD 2 was issued for HMB data including the overlapping HMB address), and thus the controller has to re-fetch the same ECC page including the HMB data for CMD 2 again into cache. However, if the cache may include more cache lines than buffers such as described above, there may be less likelihood that a cache line would need to be freed, and in any event, the cache line for CMD 1 may likely not be considered LRU before CMD 2 is received. Nevertheless, the controller may still check for overlapping HMB address ranges to block later HMB write requests bypassing earlier HMB read requests in the event the aforementioned condition arises. Moreover, the condition may possibly arise in the case that different buffers associated with different commands are linked to a same cache line, such as in the example of FIG. 8 where buffer 1 for CMD 2 and buffer 127 for CMD 128 both link to cache line 1 (storing ECC page 814) as previously described, but where between the time an HMB write request for CMD 127 is issued and the time that an HMB read request for CMD 2 is issued, the controller determined cache line 1 to be LRU, freed that line from the cache, and fetched ECC page 814 again from the HMB in response to the HMB write request for CMD 127.

Thus, the controller 123 may perform overlap detection such as described below with respect to FIG. 10 when the cache 802 accesses the HMB (fetches HMB data from the HMB) in response to a HMB read request or an HMB write request (collectively an HMB request). For example, the cache may access the HMB either when (1) the ECC page requested in an HMB request is not currently stored in a cache line of cache 802, or (2) when the controller intends to issue a HMB write request including a requested HMB address for one command and a HMB read request for another command both requesting HMB data in overlapping HMB addresses (e.g., a 128 byte address range including 0xBABA and 0xBABA+8 bytes) but there is not a free cache line (e.g., the condition previously described above). Typically, the cache may access the HMB in response to HMB requests for different commands when the HMB requests are for HMB data in different ECC pages. This is because there is more likelihood of different ECC pages being stored in different cache lines, and so both HMB requests would likely each entail a HMB fetch and thus trigger the controller to check for overlap detection. On the other hand, in the aforementioned case where the cache accesses the HMB in response to HMB requests for different commands for HMB data at overlapping HMB addresses in a same ECC page (e.g., a 128-byte page including 0xBABA . . . for one CMD and 0xBABA . . . +8 bytes for another CMD), an address overlap may result and the controller may catch this situation through the overlap detection to prevent the HMB write from bypassing the HMB read.

While the above description specifically refers to the situation of HMB write requests bypassing HMB read requests and a solution to address this situation, the various aspects of the present disclosure described throughout this disclosure are not limited to this bypass situation. For instance, the aspects of the present disclosure may similarly be applied to situations of later HMB read requests bypassing earlier HMB write requests, later HMB read requests bypassing other earlier HMB read requests, or later HMB write requests bypassing other earlier HMB write requests.

Figure 10:
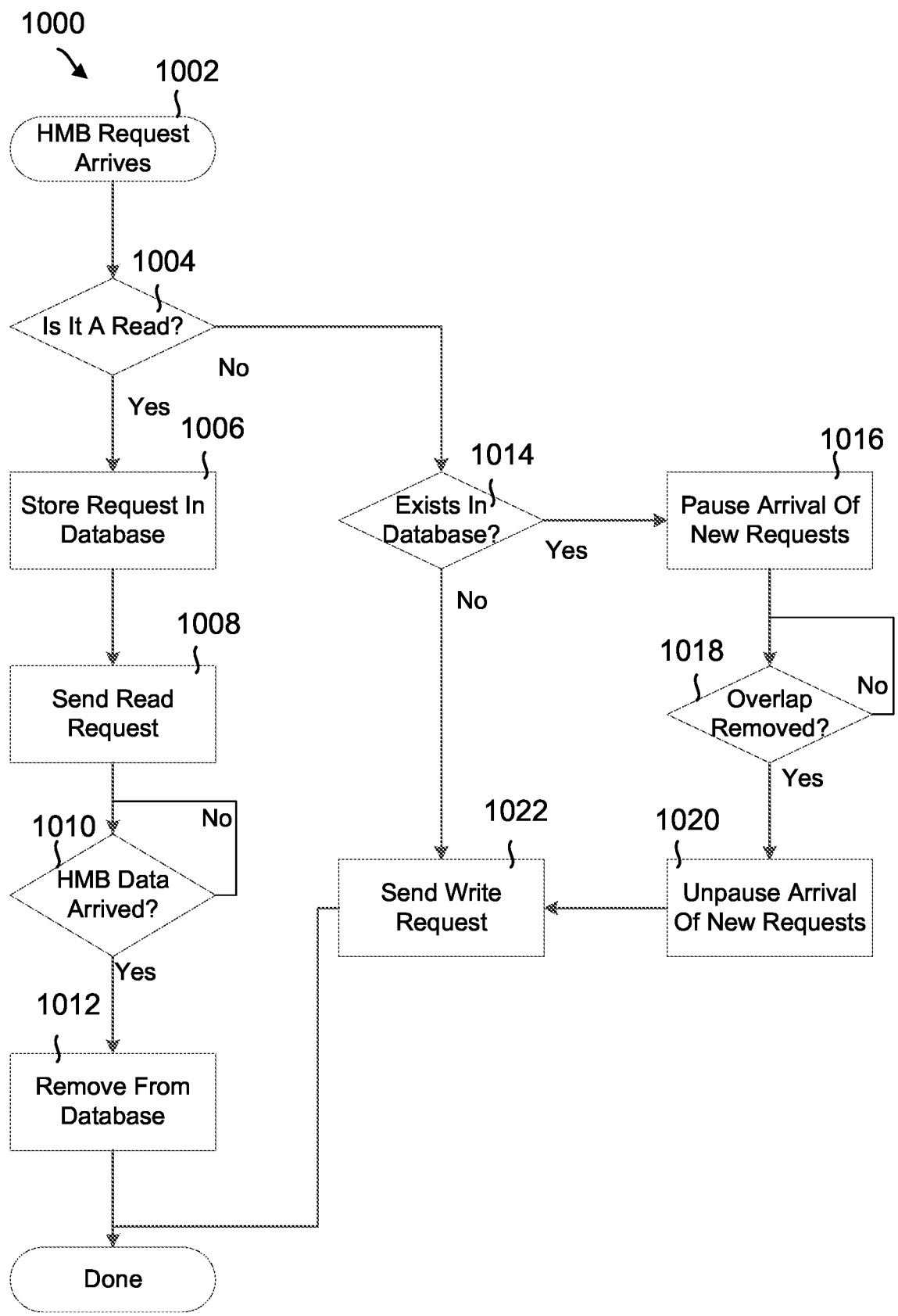
FIG. 10 is a flow chart illustrating an example of an HMB address overlap detection process, as performed by the storage device of FIG. 1.

FIG. 10 illustrates an example 1000 of an overlap detection process which the controller 123 may perform in response to an HMB request (e.g., a HMB read request or an HMB write request) triggered in a command process pipeline. For instance, at block 1002, the controller may perform this overlap detection process for a command when the controller issues an HMB request to fetch HMB data from HMB 804 into cache 802 at block 908 of FIG. 9A. The controller may first decide whether to access the HMB 804 in response to an HMB request. For example, the controller may determine whether an ECC page including the requested HMB data is previously stored in cache 802 for another HMB request. If the requested HMB data is not currently in cache 802 (e.g., due to this ECC page being a newly fetched ECC page, or a previously fetched ECC page which was freed from cache due to being LRU as described above), the controller may determine to access the HMB to obtain the ECC page including the HMB data for the current command (e.g., corresponding to buffer F, such as CMD 1).

Accordingly, in response to this determination, the controller first checks at block 1004 if the HMB request is an HMB read request (as opposed to an HMB write request involving read-modify-write). If so, then at block 1006, the controller stores the requested HMB address (e.g., 0xBABA . . . ) or HMB address range including the requested HMB address in a database or list of tracked HMB requests. Afterwards, the controller 123 at block 1008 may fetch the HMB data at the requested HMB address into the cache as previously described. For instance, the cache 802 may request the HMB data from the host over the PCIe bus and store the received HMB data in a next available cache line having a cache line address, after which the controller may store a pointer to the cache line address in one of the buffers 810 associated with HMB request triggered by the command 602. After the controller determines at block 1010 that data is fetched (e.g., the buffer associated with the current request has been linked to the cache line storing the HMB data), then at block 1012, the controller may remove the requested HMB address from the database.

Later, in the event the controller receives a subsequent command (e.g., CMD 2) to access the HMB 804 as previously described, the controller may again check at block 1004 if the HMB request is an HMB read request or an HMB write request. If the controller determines that the next request is a HMB write request, then at block 1014, the controller may check whether the requested HMB address in the HMB write request is currently stored in the database. If the controller finds the same address in the database, then the controller may determine an overlap in HMB addresses, potentially resulting in a write bypass read situation. Therefore, at block 1016, the controller may wait to fetch the HMB data for the HMB write request (as well as refrain from executing subsequent HMB write requests) until after the previous HMB read request is completed at block 1010, in which case the controller will remove the overlapping HMB address from the database at block 1012. Once the controller determines at block 1018 that the overlapping HMB address is no longer existing in the database, the controller may determine that no overlap exists, and therefore at block 1020, the controller may resume executing the current (and any stalled subsequent) HMB write requests. Accordingly, at block 1022, the controller may fetch the HMB data for the HMB write request into cache 802 as previously described. For instance, the cache 802 may request the HMB data from the host over the PCIe bus and store the received HMB data in a next available cache line having a cache line address, after which the controller may store a pointer to the cache line address in one of the buffers 810 associated with the HMB request triggered by the command 602. The controller may afterwards update the HMB data linked to the buffer at the stored cache line address, and subsequently flush the HMB data back to cache 802.

Figure 11A:
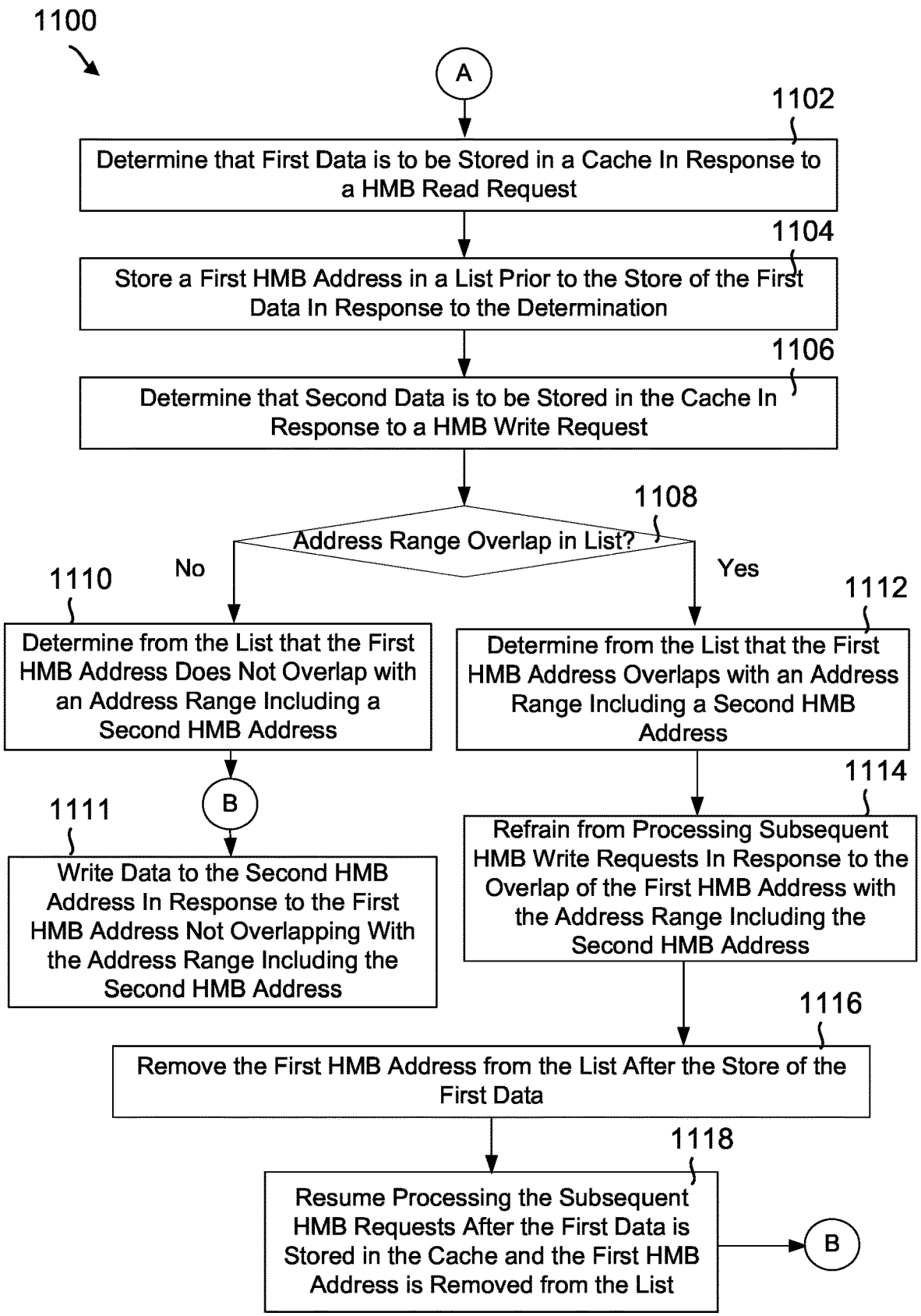
Figure 11C:
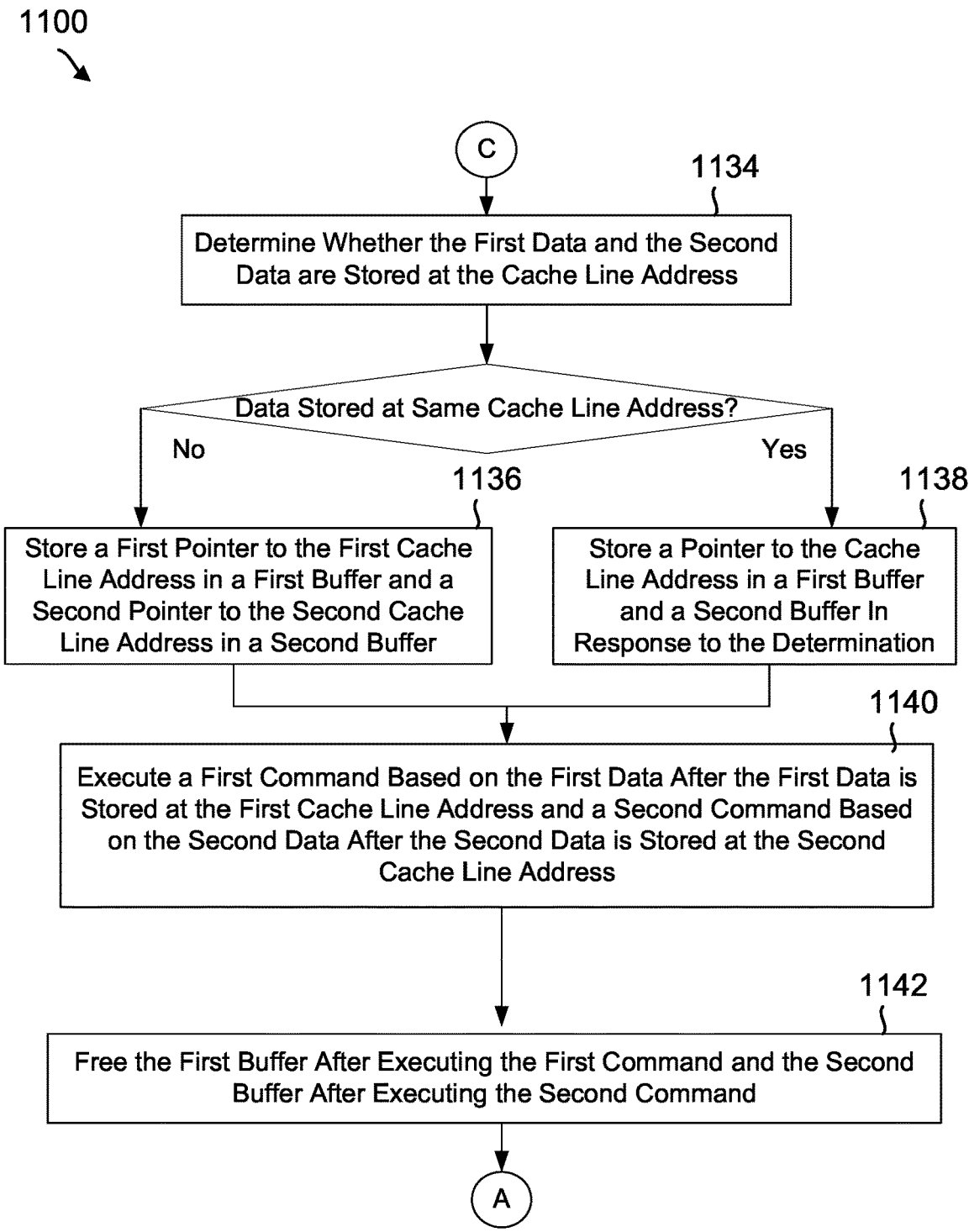

FIGS. 11A-11C illustrate an example flow chart 1100 of a method for processing HMB requests according to the various aspects of the present disclosure previously described. For example, the method can be carried out in a storage device 102 such as the one illustrated in FIG. 1. Each of the steps in the flow chart can be controlled using the controller as described below (e.g. controller 123), by a component or module of the controller, or by some other suitable means.

Referring to FIG. 11A, as represented by block 1102, the controller may determine that first data is to be stored in a cache in response to a HMB read request. The cache may be coupled to the controller. For instance, referring to the aforementioned Figures, the controller 123 may determine that first data is to be stored in cache 802 in response to HMB read request 604, 708. The controller may make this determination, for instance, at block 1004 in FIG. 10 when performing HMB address overlap detection in response to a first HMB request or command (e.g., CMD 1 or CMD 2 in FIG. 6). The first data may be HMB data, for example, data at HMB address 0xAAAA . . . or HMB address 0xBABA . . . , which may include logical address 208 or other control information, or alternatively user data. The cache 802 may be coupled to the controller 123 (e.g., the cache 802 may be coupled to processor 702 within controller 123).

As represented by block 1104, the controller may store a first HMB address in a list prior to the store of the first data in response to the determination at 1102. For instance, referring to the aforementioned Figures, the controller 123 may store the HMB address of the first data (e.g., HMB address 0xAAAA . . . , HMB address 0xBABA . . . or a range of HMB addresses including HMB address 0xAAAA . . . or HMB address 0xBABA . . . ) in a list or database prior to storing the first data in cache 802. The controller may store this HMB address in the list or database, for instance, at block 1006 of FIG. 10, which step may occur prior to the controller issuing the HMB read request 604, 708 at block 1008 in order to store the HMB data at the first HMB address in cache 802 (e.g., at one of the cache lines 808) and to link one of the buffers 810 to the cache line with the cache line address 812, for example, according to the processes of FIGS. 9A and 9B.

As represented by block 1106, the controller may determine that second data is to be stored in the cache in response to a HMB write request. For instance, referring to the aforementioned Figures, the controller 123 may determine that second data is to be stored in cache 802 in response to HMB write request 710 (e.g., during a pre-process in FIG. 6 or at some other time). The controller may make this determination, for instance, at block 1004 in FIG. 10 when performing HMB address overlap detection in response to a second HMB request or command (e.g., CMD 2 or CMD 127). The second data may be HMB data, for example, data at HMB address 0xBABA . . . or HMB address 0xBABA . . . +8 bytes, which may include a different logical address or other control information, or alternatively user data, than the first data.

As represented by block 1108, the controller may determine from the list whether an HMB address range overlap exists. For instance, the controller may determine, as represented by block 1110, that the first HMB address does not overlap with an HMB address range including a second HMB address. In such case, the controller may proceed to issue a request to store the HMB data in cache, as described below with respect to FIGS. 11B and 11C. Afterwards, as represented by block 1111, the controller may write data to the second HMB address in response to the first HMB address not overlapping with the address range including the second HMB address. For instance, referring to the aforementioned Figures, the controller 123 may determine from the list or database, at block 1014 of FIG. 10, that the HMB address of the first data and the HMB address of the second data do not overlap. As an example, if the first data is contained in one ECC page 806 having an HMB address range including first HMB address 0xAAAA . . . and the second data is contained in a different ECC page 806 having a different HMB address range including second HMB address 0xBABA . . . , then the controller may determine at block 1014 that the HMB addresses do not overlap. As a result, the controller may proceed to issue the HMB write request 710 at block 1022 in order to store the HMB data at the second HMB address in cache 802 (e.g., at a different one of the cache lines 808) and to link another one of the buffers 810 to the cache line with the cache line address 812, for example, according to the processes of FIGS. 9A and 9B. After the HMB data is stored in response to the determination of no overlap, then the controller 123 may write (e.g., update) the HMB data in the cache line linked in the buffer at the location of the corresponding HMB address, and then later flush the updated HMB data to the HMB.

Alternatively, the controller may determine, at block 1112, that the first HMB address overlaps with an address range including a second HMB address. In such case, as represented by block 1114, the controller may refrain from processing subsequent HMB write requests in response to the overlap of the first HMB address with the address range including the second HMB address. The controller may continue to refrain from this processing until, as represented by block 1116, the controller removes the first HMB address from the list after the store of the first data. In such case, as represented by block 1118, the controller may resume processing the subsequent HMB requests after the first data is stored in the cache and the first HMB address is removed from the list. For instance, referring to the aforementioned Figures, the controller 123 may determine from the list or database, at block 1014 of FIG. 10, that the HMB address of the first data and the HMB address of the second data do overlap. As an example, if the first data is contained in one ECC page 814 having an HMB address range including first HMB address 0xBABA . . . and the second data is contained in the same ECC page 814 having the same HMB address range including second HMB address 0xBABA . . . +8 bytes, then the controller may determine at block 1014 that the HMB addresses do overlap. As a result, the controller may refrain from issuing the HMB write request 710 at block 1016, as well as refrain from issuing subsequent HMB read requests or HMB write requests at block 1016 (e.g., for subsequent commands like CMD 3, CMD 4, etc.), until the controller determines at block 1010 that the prior HMB read request 604, 708 has completed (e.g., the HMB data has been successfully fetched into cache 802 and linked in one of the buffers 810) and performs the step at block 1012 of removing the overlapping HMB address (e.g., 0xBABA . . . ) from the database or list. At that point, the controller may determine at block 1018 that the overlap has been removed from the list, in which case the controller may resume processing the HMB write request 710 at block 1020 (as well as cease the stalling of subsequent HMB read requests or HMB write requests). For example, the controller may proceed to issue the HMB write request 710 at block 1022 and subsequently write the fetched HMB data as previously described.

Referring to FIG. 11B, as represented by block 1120, the controller may store in the cache first data from a HMB at the first HMB address in the response to the HMB read request, and the controller may store second data from the HMB at the second HMB address in response to the HMB write request. The controller may store the first data and the second data at different times. For instance, the first data may be stored in the process of FIG. 11A after block 1104 and before block 1106, or at some other time in the process. Moreover, the second data may be stored in the process of FIG. 11A after block 1118. For instance, referring to the aforementioned Figures, the controller 123 may issue HMB read request 604, 708 at block 1008 (e.g., block 908) to obtain the first data (e.g., the HMB data described at block 1102 at HMB address 0xAAAA . . . or HMB address 0xBABA . . . ) from HMB 804 (e.g., over the PCIe bus) and to store the obtained HMB data in a next available one of the cache lines 808 of cache 802. Similarly, the controller may issue HMB write request 710 at block 1022 (e.g., block 908 again) to obtain the second data (e.g., the HMB data described at block 1106 at HMB address 0xBABA . . . or HMB address 0xBABA . . . +8 bytes) from HMB 804 (e.g., again over the PCIe bus) and to store the obtained HMB data in a different available one of the cache lines 808 of cache 802.

In one example within block 1120, as represented by block 1122, the controller may determine that the first data is not previously stored in the cache and the controller may determine that the second data is not previously stored in the cache. In response to these determinations, as represented by block 1124, the controller may store the first data in the cache and the controller may store the second data in the cache. The controller may determine that the first data is not previously stored in the cache and that the second data is not previously stored in the cache at different times, similar to as described above with respect to the storing at block 1120. For instance, referring to the aforementioned Figures, the controller 123 may determine the first data (e.g., the HMB data at HMB address 0xAAAA . . . or HMB address 0xBABA . . . ) is not already stored in one of the cache lines 808 of cache 802, in response to which determination the controller may store the first data in the cache 802 as described above in block 1120. Similarly, the controller 123 may determine the second data (e.g., the HMB data at HMB address 0xBABA . . . or HMB address 0xBABA . . . +8 bytes) is not already stored in one of the cache lines 808 of cache 802, in response to which determination the controller may store the second data in the cache 802 as similarly described above in block 1120. In one example, the controller may determine that the first data and/or the second data are not previously stored in cache by searching each cache line 808 in the cache 802 for the HMB data. In other examples, the controller may determine that the first data and/or the second data are not previously stored in cache based on buffers 810 or a buffer-to-cache line mapping table, as previously described.

In one example within block 1124, as represented by block 1126, the controller may determine whether a first buffer associated with the HMB read request is free and determine whether a second buffer associated with the HMB write request is free. In response to these determinations, as represented by block 1128, the controller may store the first data in the cache and the second data in the cache. The controller may determine whether the first buffer and whether the second buffer are free at different times, similar to as described above with respect to the storing at blocks 1120 and 1124. For instance, referring to the aforementioned Figures, the controller 123 may determine at block 906 if one of the buffers 810 (e.g., current buffer F=0) which the controller will link to the first data (e.g., the HMB data at HMB address 0xAAAA . . . or HMB address 0xBABA . . . ) by a next available one of the cache line addresses 812, is currently free, in response to which determination the controller may store the first data in the cache 802 as described above in block 1120. Similarly, the controller may determine at block 906 (at a different time) if another one of the buffers 810 (e.g., current buffer F=1) which the controller will link to the second data (e.g., the HMB data at HMB address 0xBABA . . . or HMB address 0xBABA . . . +8 bytes) by a next available one of the cache line addresses 812, is currently free, in response to which determination the controller may store the second data in the cache 802 as also described above in block 1120.

In one example within block 1128, as represented by block 1130, the controller may store the first data at a first cache line address and the second data at a second cache line address. The controller may store the first data and the second data at different times, similar to as described above with respect to the storing at blocks 1120, 1124, and 1128. For instance, referring to the aforementioned Figures, when the controller 123 stores the first data (e.g., the HMB data at HMB address 0xAAAA . . . or HMB address 0xBABA . . . ) in a next available one of the cache line addresses 812 of cache 802, the first data may be stored for example starting at SRAM address "0" (e.g., cache line 0 in FIG. 8). Similarly, when the controller 123 stores second first data (e.g., the HMB data at HMB address 0xBABA . . . or HMB address 0xBABA . . . +8 bytes) in a next available one of the cache line addresses 812 of cache 802, the second data may be stored for example starting at a different SRAM address "128" (e.g., cache line 1 in FIG. 8). Alternatively, the first data and the second data may be stored at the same cache line address (e.g., the first data at HMB address 0xBABA . . . and the second data at HMB address 0xBABA . . . +8 bytes may both be stored in the cache starting at SRAM address "128" or in cache line 1 in response to one of the two HMB requests).

Additionally, in one example within block 1130, as represented by block 1132, the controller may free a LRU cache line address, where the second data is stored at the LRU cache line address. For instance, referring to the aforementioned Figures, the controller 123 may store the second data (e.g., the HMB data at HMB address 0xBABA . . . or HMB address 0xBABA . . . +8 bytes) at a next available cache line after first freeing that cache line from storing other HMB data (e.g., due to that cache line being LRU). For instance, after storing the first data in cache line 0 of cache 802, if the controller later determines that cache line 1 is a least recently used cache line in cache 802, then before storing the second data in cache line 1 as previously described, the controller may first flush old HMB data in cache line 1 to the HMB, and then clear the memory of cache line 1 in order to free the cache line prior to issuing the HMB write request 710.

Now referring to FIG. 11C, as represented by block 1134, the controller may determine whether the first data and the second data are stored at the cache line address (e.g., a same cache line address). If the controller determines that the first data and the second data are not stored at the same cache line address (e.g., the data are stored at different cache line addresses), then as represented by block 1136, the controller may store a first pointer to the first cache line address in the first buffer and a second pointer to the second cache line address in a second buffer. Otherwise, if the controller determines that the first data and the second data are stored at the same cache line address, then as represented by block 1138, the controller may store a pointer to the cache line address in the first buffer and the second buffer. For instance, referring to the aforementioned Figures, after the first data (e.g., the HMB data at HMB address 0xAAAA . . . or HMB address 0xBABA . . . ) and the second data (e.g., the HMB data at HMB address 0xBABA . . . or HMB address 0xBABA . . . +8 bytes) are stored in one or more of the cache lines at the next available cache line address(es) 812 in response to the HMB read request 604, 708 and/or HMB write request 710, the controller may determine whether the first data and the second data are stored in the same cache line. The controller may determine the cache line(s) in which the first data and the second data are stored in a similar manner to that described above at block 1122. If the first data and second data are not stored in the same cache line (e.g., the first data is stored at cache line 0 and the second data is stored at cache line 1 as previously described in one example), then the controller may link different ones of the buffers 810 to the respective cache lines. For instance, the controller may store a pointer for cache line 0 (e.g., SRAM address 0) containing the first data in buffer 0, and the controller may store another pointer for cache line 1 (e.g., SRAM address 128) containing the second data in buffer 1. Alternatively, if the first data and the second data are stored in the same cache line (e.g., the first data and second data are both stored at cache line 1 as previously described in another example), then the controller may link different ones of buffers 810 to the same cache line. For instance, the controller may store a pointer for cache line 1 (e.g., SRAM address 128) containing the first data in buffer 1, and the controller may store a pointer for a different location in cache line 1 (e.g., SRAM address 128+8 bytes=SRAM address 136) containing the second data in buffer 127.

Then, as represented by block 1140, the controller may execute a first command based on the first data after the first data is stored at the first cache line address, and the controller may execute a second command based on the second data after the second data is stored at the second cache line address. The controller may execute the first command and the second command at different times in the process. For instance, referring to the aforementioned Figures, after the first data (e.g., the HMB data at HMB address 0xAAAA . . . or HMB address 0xBABA . . . ) is stored in a cache line at the next available cache line address(es) 812 in response to the HMB read request 604, 708, the controller 123 may execute one of the commands 602 which triggered the HMB read request (e.g., CMD 1 in FIG. 6). For example, as described above at block 958, the controller may read data from the NVM 110 based on the HMB data linked in buffer U=0 in response to CMD 1. Similarly, after the second data (e.g., the HMB data at HMB address 0xBABA . . . or HMB address 0xBABA . . . +8 bytes) is stored in a cache line at the next available cache line address(es) 812 in response to the HMB write request 710, the controller 123 may execute another one of the commands 602 which triggered the HMB write request (e.g., CMD 2 in FIG. 6). For example, as also described above at block 958, at a different time in the process, the controller may write data to the NVM 110 based on the HMB data linked in buffer U=1 in response to CMD 2.

Finally, as represented by block 1142, the controller may free the first buffer after executing the first command and the controller may free the second buffer after executing the second command. For instance, referring to the aforementioned Figures, at block 960, the controller 123 may free buffer U=0 after executing CMD 1 at block 958 (e.g., as described above at block 1140). Similarly, at a different time in the process, the controller 123 may free buffer U=1 after executing CMD 2 at block 958 (e.g., as also described above at block 1140). The controller may then repeat the processes described above in FIGS. 11A-11C for other HMB requests or commands.

Figure 12:
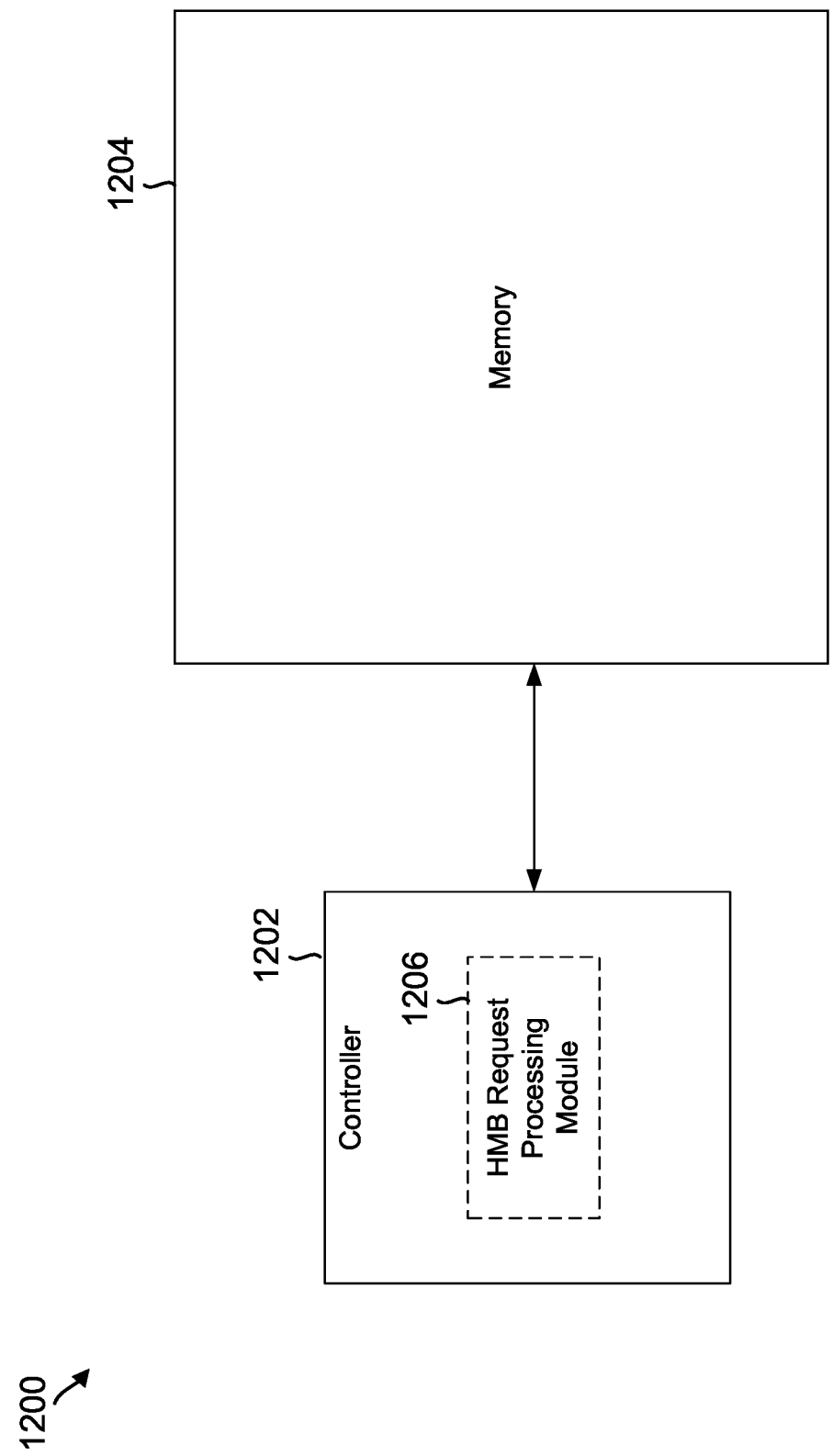
FIG. 12 is a conceptual diagram illustrating an example of a controller that processes HMB requests in the storage device of FIG. 1.

FIG. 12 is a conceptual diagram illustrating an example 1200 of a controller 1202 coupled to a memory 1204 in a storage device. For example, controller 1202 may correspond to controller 123 and memory 1204 may correspond to the NVM 110 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 1202 includes an HMB request processing module 1206 that may provide a means for storing in the cache, in response to a HMB read request, first data from a HMB at a first HMB address, and for storing in the cache, in response to an HMB write request, second data from the HMB at a second HMB address; and a means for refraining from processing subsequent HMB write requests in response to an overlap of the first HMB address with an address range including the second HMB address. For example, the HMB request processing module may perform the process or algorithm described above with respect to FIGS. 11A-11C.

Thus, aspects of the present disclosure allow a controller to maintain a command process pipeline including HMB read requests and HMB write requests with maintained KiOPs such as shown in FIGS. 6 and 7. The KiOPs may be maintained since the controller may apply a cache and buffers such as shown in FIG. 8, which the controller may fetch and link with HMB data according to the processes of FIGS. 9A-9B, in order to reduce the likelihood of overlapping HMB addresses being detected when the controller performs an overlap detection process such as shown in FIG. 10. For instance, the controller may fetch non-cached HMB data for each command in the pipeline into a cache line and link the fetched cache line to each CMD buffer. The controller may perform overlap detection each time the controller performs a fetch to make sure writes do not bypass reads (or to prevent other bypass situations). The controller may execute each command after the cache line is fetched (or after a similar period of turnaround time for consistency), and the controller may unlink each completed request from its buffer to use for subsequent requests. In the event an overlap situation is detected between HMB addresses of pending HMB read requests and HMB write requests, the controller may stall one of the overlapping HMB requests (as well as subsequent HMB requests) until the other overlapping request completes. As a result, the controller may maintain a fast pipeline for processing each command with high KiOPs, improving storage device performance.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:
1. A storage device, comprising:
 a cache, and
 a controller coupled to the cache, wherein the controller is configured to:
  store in the cache, in response to a host memory buffer (HMB) read request, first data from a HMB at a first HMB address;

store in the cache, in response to an HMB write request, second data from the HMB at a second HMB address; and refrain from processing subsequent HMB write requests in response to an overlap of the first HMB address with an address range including the second HMB address.

2. The storage device of claim 1, wherein the controller is further configured to determine that the first data is not previously stored in the cache and that the second data is not previously stored in the cache, and to store the first data in the cache and to store the second data in the cache in response to the determination.

3. The storage device of claim 1, wherein the cache includes a first cache line address and a second cache line address, and the controller is further configured to store the first data at the first cache line address and to store the second data at the second cache line address.

4. The storage device of claim 1, wherein the controller is further configured to free a least recently used (LRU) cache line address, and the second data is stored at the LRU cache line address.

5. The storage device of claim 1, wherein the HMB read request is in response to a first command and the HMB write request is in response to a second command.

6. The storage device of claim 1, further comprising: a first buffer and a second buffer, wherein the first buffer is associated with the HMB read request and the second buffer is associated with the HMB write request.

7. The storage device of claim 6, wherein the controller is further configured to determine whether the first buffer is free, to store the first data in the cache in response to the determination that the first buffer is free, to determine whether the second buffer is free, and to store the second data in the cache in response to the determination that the second buffer is free.

8. The storage device of claim 6, wherein the cache includes a first cache line address and a second cache line address, the controller is further configured to store a first pointer to the first cache line address in the first buffer, and to store a second pointer to the second cache line address in the second buffer.

9. The storage device of claim 6, wherein the cache includes a cache line address, the controller is further configured to determine that the first data and the second data are stored at the cache line address, and the controller is further configured to store a pointer to the cache line address in the first buffer and the second buffer.

10. The storage device of claim 1, wherein the controller is further configured to determine that the first data is to be stored in the cache in response to the HMB read request, to store the first HMB address in a list prior to the store of the first data in response to the determination, and to remove the first HMB address from the list after the store of the first data.

11. The storage device of claim 10, wherein the controller is further configured to determine that the second data is to be stored in the cache in response to the HMB write request, to determine from the list that the first HMB address overlaps with the address range including the second HMB address, and to refrain from processing subsequent HMB requests in response to the determinations.

12. The storage device of claim 11, wherein the controller is further configured to resume processing the subsequent HMB requests after the first data is stored in the cache and the first HMB address is removed from the list.

13. A storage device, comprising:
a cache including a first cache line address and a second cache line address, and
a controller coupled to the cache, wherein the controller is configured to:
store at the first cache line address, in response to a host memory buffer (HMB) read request, first data from a HMB at a first HMB address;
store at the second cache line address, in response to an HMB write request, second data from the HMB at a second HMB address; and
write data to the second HMB address in response to the first HMB address not overlapping with an address range including the second HMB address.

14. The storage device of claim 13, wherein the controller is further configured to execute a first command based on the first data after the first data is stored at the first cache line address, and to execute a second command based on the second data after the second data is stored at the second cache line address.

15. The storage device of claim 14, further comprising:
a first buffer and a second buffer, wherein the first buffer is associated with the HMB read request and the second buffer is associated with the HMB write request; and
wherein the controller is further configured to store a first pointer to the first cache line address in the first buffer, and to store a second pointer to the second cache line address in the second buffer; and
wherein the controller is further configured to free the first buffer after executing the first command and to free the second buffer after executing the second command.

16. The storage device of claim 13, wherein the controller is further configured to determine that the first data is to be stored at the first cache line address in response to the HMB read request, and to store the first HMB address in a list prior to the store of the first data in response to the determination.

17. The storage device of claim 16, wherein the controller is further configured to remove the first HMB address from the list after the store of the first data.

18. The storage device of claim 16, wherein the controller is further configured to determine that the second data is to be stored at the second cache line address in response to the HMB write request, to determine from the list that the first HMB address does not overlap with the address range including the second HMB address, and to write the data to the second HMB address in response to the determinations.

19. A storage device, comprising:
a cache including a first cache line address and a second cache line address, and
a controller coupled to the cache, wherein the controller is configured to:
store at the first cache line address, in response to a host memory buffer (HMB) read request, first data from a HMB at a first HMB address;
store at the second cache line address, in response to an HMB write request, second data from the HMB at a second HMB address;
refrain from processing subsequent HMB requests before the first data is stored in response to an overlap of the first HMB address with an address range including the second HMB address; and
resume processing the subsequent HMB requests after the first data is stored.

20. The storage device of claim 19, further comprising:
a first buffer and a second buffer, wherein the controller is further configured to store a first pointer to the first cache line address in the first buffer, and to store a second pointer to the second cache line address in the second buffer.

\* \* \* \* \*